US012668073B2

(12) United States Patent
Takahashi et al.

(10) Patent No.: US 12,668,073 B2
(45) Date of Patent: Jun. 30, 2026

(54) PRINTING APPARATUS

(71) Applicant: BROTHER KOGYO KABUSHIKI KAISHA, Nagoya (JP)

(72) Inventors: Hiroaki Takahashi, Nagoya (JP); Yasuo Nishikawa, Nagoya (JP); Yoshimitsu Taniguchi, Tajimi (JP); Kosuke Inuzuka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 94 days.

(21) Appl. No.: 18/465,617

(22) Filed: Sep. 12, 2023

(65) Prior Publication Data

US 2024/0092102 A1 Mar. 21, 2024

(30) Foreign Application Priority Data

Sep. 16, 2022 (JP) ................................ 2022-148185

(51) Int. Cl.

| | |
|---|---|
| ***B41J 11/66*** | (2006.01) |
| ***B41J 11/00*** | (2006.01) |
| ***B41J 11/70*** | (2006.01) |
| ***B41J 13/10*** | (2006.01) |
| ***B41J 29/13*** | (2006.01) |

(52) U.S. Cl.

CPC ........... *B41J 29/13* (2013.01); *B41J 11/0045* (2013.01); *B41J 11/706* (2013.01); *B41J 13/10* (2013.01)

(58) Field of Classification Search

CPC ... B41J 29/13; B41J 11/66; B41J 11/68; B41J 11/70; B41J 11/706

See application file for complete search history.

(56) References Cited

U.S. PATENT DOCUMENTS

| | | | | |
|---|---|---|---|---|
| 2011/0242249 | A1* | 10/2011 | Yazawa | B41J 2/17566 347/108 |
| 2020/0016901 | A1* | 1/2020 | Chino | B41J 2/17566 |
| 2021/0008906 | A1* | 1/2021 | Yamada | B41J 11/706 |
| 2022/0184979 | A1* | 6/2022 | Fukasawa | B41J 11/70 |

FOREIGN PATENT DOCUMENTS

| | | |
|---|---|---|
| JP | 2021-013973 A | 2/2021 |

* cited by examiner

*Primary Examiner* — Scott A Richmond
(74) *Attorney, Agent, or Firm* — Kenealy Vaidya LLP

(57) ABSTRACT

There is provided a printing apparatus including: a casing, an opening/closing part, a printing part, a processing unit and a shielding part. The casing has an opening. The opening/closing part is movable to a first position to a second position. The printing part has an installment part and prints an image on a print medium. The processing unit is arranged on a downstream side in a conveyance direction, of the print medium, with respect to the printing part and processes the print medium. The shielding part shields at least a part of the processing unit. When the opening/closing part is at the second position, the opening is capable of releasing a location above the installment part or a part, of the installment part. When the opening/closing part is at the second position, the shielding part shields at least the part of the processing unit.

40 Claims, 16 Drawing Sheets

PRINTING APPARATUS

REFERENCE TO RELATED APPLICATIONS

This application claims priority from Japanese Patent Application No. 2022-148185 filed on Sep. 16, 2022. The entire content of the priority application is incorporated herein by reference.

BACKGROUND ART

There is a publicly known printing apparatus provided with a printing part which prints an image on a paper sheet (sheet, paper), a cutter device which cuts the sheet on which the image is printed by the printing part, and a panel which is capable of releasing a part of the interior of a casing of the printing apparatus to the outside. A certain publicly known printing apparatus is configured such that the panel is opened to thereby make it possible to exchange an ink cartridge.

In the above-described publicly known printing apparatus, in a case that a user opens the panel so as to exchange the ink cartridge, there is such a possibility that the user might access the cutter device. An object of the present disclosure is to prevent the access to a processing unit, such as the cutter device, in a case that a cartridge is (being) exchanged.

DESCRIPTION

According to an aspect of the present disclosure, there is provided a printing apparatus including: a casing, an opening/closing part, a printing part, a processing unit and a shielding part. An opening is defined in the casing. The opening/closing part is configured to be movable to a first position at which the opening/closing part covers the opening and to a second position at which the opening/closing part releases the opening. The printing part includes an installment part in which a cartridge is installed, and is configured to print an image on a print medium. The processing unit is arranged on a downstream side in a conveying direction, of the print medium, with respect to the printing part, and is configured to process the print medium having the image printed thereon by the printing part. The shielding part is configured to shield at least a part of the processing unit. In a case that the opening/closing part is located at the second position, the opening is located at a position at which the opening releases a location above the installment part or a part, of the installment part, on the downstream side in the conveying direction to an outside of the casing. In a case that the opening/closing part is located at the second position, the shielding part is configured to shield at least the part of the processing unit from the outside of the casing The printing apparatus is provided with the shielding part configured to shield at least the part of the processing unit from the outside of the casing in the case that the opening/closing part is located at the second position at which the opening/closing part releases the opening. Accordingly, in a case that the cartridge is being exchanged, it is possible to prevent, by the shielding part, any access to the processing unit.

FIRST EMBODIMENT

<Configuration of Ink-Jet Printer 1>

Figure 1:
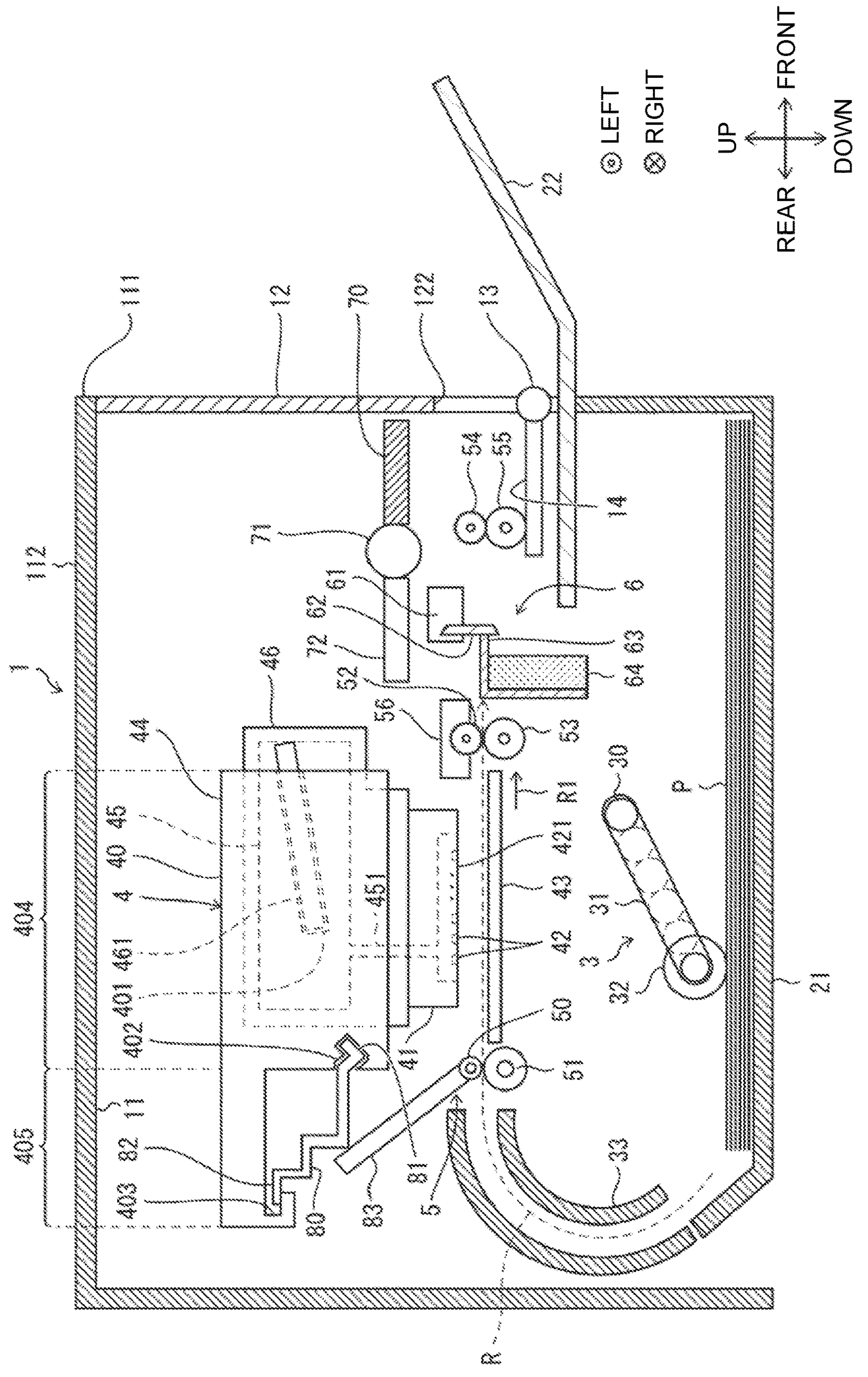
FIG. 1 is a cross-sectional view depicting an example of the internal configuration of an ink-jet printer 1.

In FIG. 1, the up-down direction is defined, with a state in which an ink-jet printer 1 is operably installed (the state of FIG. 1) as the reference; the front-rear direction is defined, with a side on which a wall from which a sheet P is discharged is defined as a front wall 111; and the left-right direction is defined, with the ink-jet printing 1 as seen from the front side. The up-down direction, the front-rear direction, and the left-right direction are orthogonal to one another. Note that in FIGS. 2, 4 and 8, an upper wall 112 of a casing 11, a discharge tray 22, a curved member 33, a platen 43, a pinch roller 50, a supporting frame 80 and a sheet metal 83 are omitted.

As depicted in FIG. 1, the ink-jet printer 1 is provided with the casing 11, the cover 12, a feed tray 21, the discharge tray 22, a feeding part 3, a printing part 4, a conveyor 5 and a cutter unit 6. The casing 11 has a substantially rectangular parallelepiped shape. The ink-jet printer 1 is a printer of a so-called on-carriage type in which a cartridge 46 is installed in an installment part 44 provided on a head carriage 40.

The ink-jet printer 1 is an example of a “printing apparatus”. The ink-jet printer 1 has a print function which is of an ink-jet system wherein, for example, an ink is discharged or ejected onto a sheet P to thereby perform printing of print data, specified by a print job, on the sheet P. The ink is an example of a “liquid”. The ink-jet printer 1 may be capable of performing color printing or may be dedicated only to monochromatic printing. The sheet P is an example of a “print medium” and is, for example, a plain paper sheet of the A4 size. Note that the print medium is exemplified, for example, by thick paper, thin paper, etc., other than the plain paper sheet of the A4 size.

<Configuration of Casing 11 and Cover 12>

Figure 3:
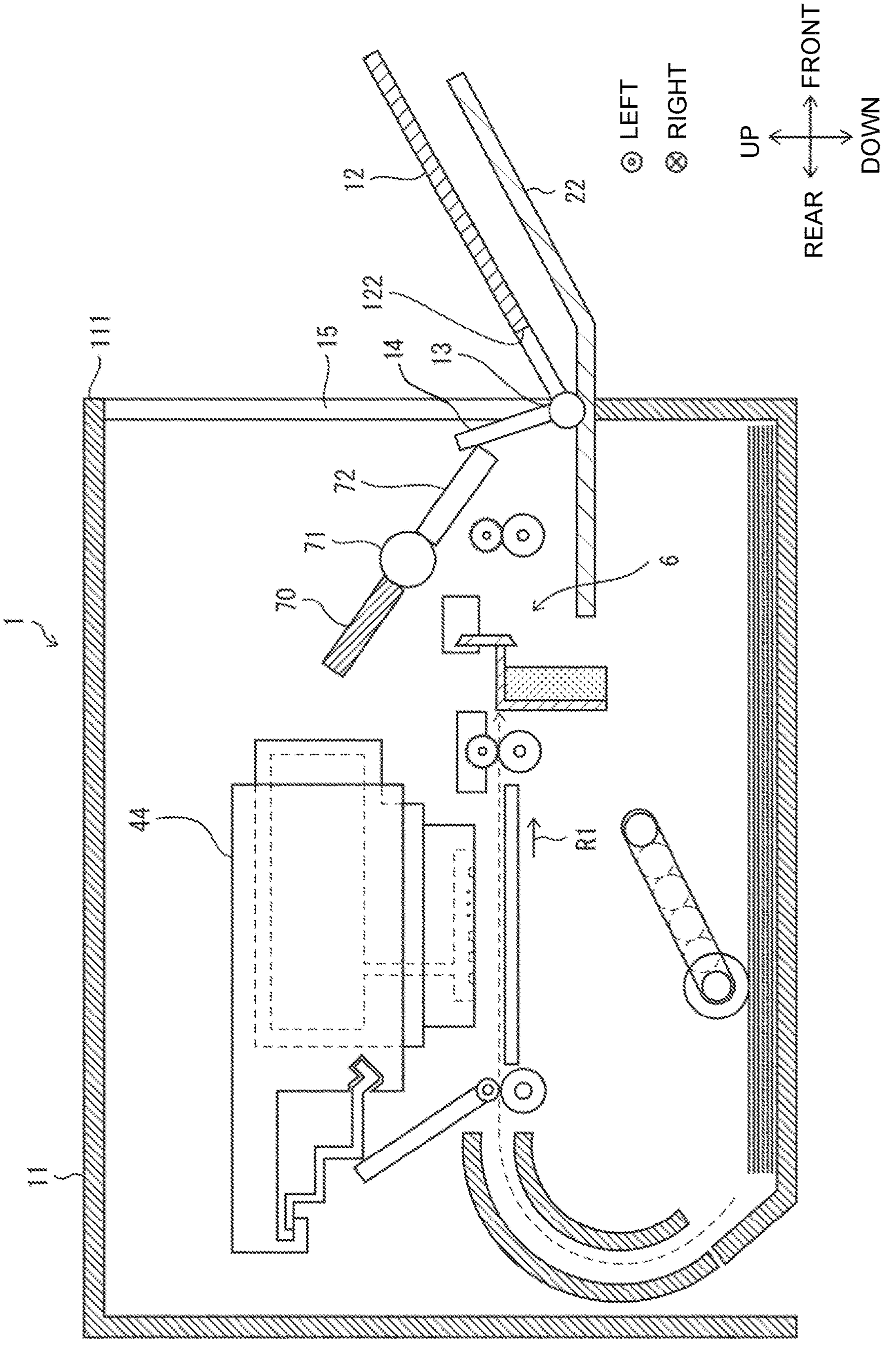
FIG. 3 is a cross-sectional view depicting a state that a cover is opened in the ink-jet printer 1 depicted in FIG. 1.

As depicted in FIG. 3, an opening 15 is defined or formed in the front wall 111 of the casing 11. The front wall 111 is a wall on a downstream side in a conveying direction R1 of the sheet Pin the casing 11. The cover 12 is provided on the front wall 111. The cover 12 is provided to be movable to a first position at which the cover 12 covers the opening 15 and to a second position at which the cover 12 releases or opens the opening 15. Specifically, the cover 12 is provided to be rotatable with respect to the front wall 111, via a rotation shaft 13. The cover 12 is an example of an "opening/closing part". The cover 12 and the rotation shaft 13 are arranged at a location above the discharge tray 22.

Figure 2:
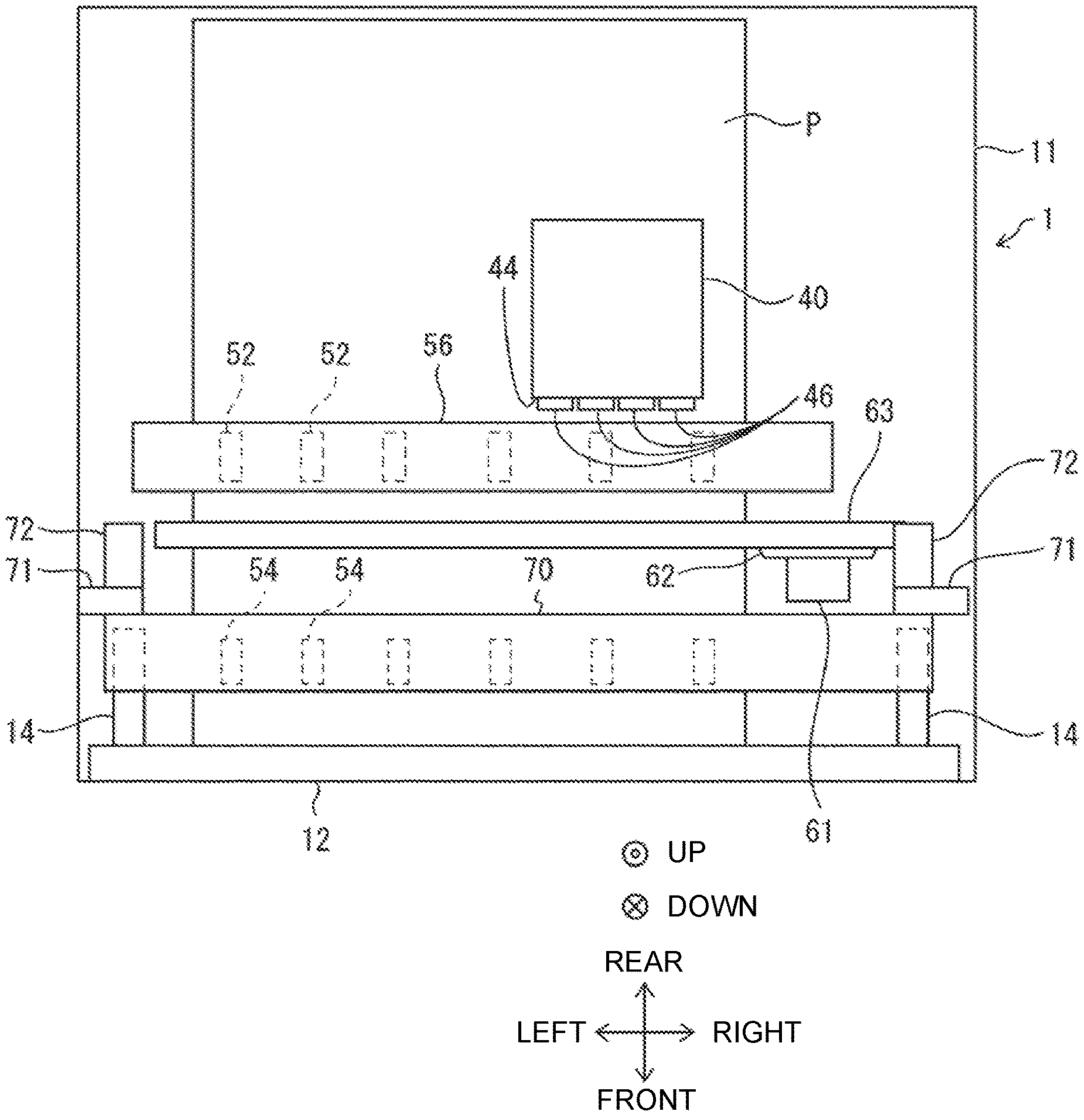
FIG. 2 is a view of the ink-jet printer 1 depicted in FIG. 1, as seen from thereabove.
Figure 4:
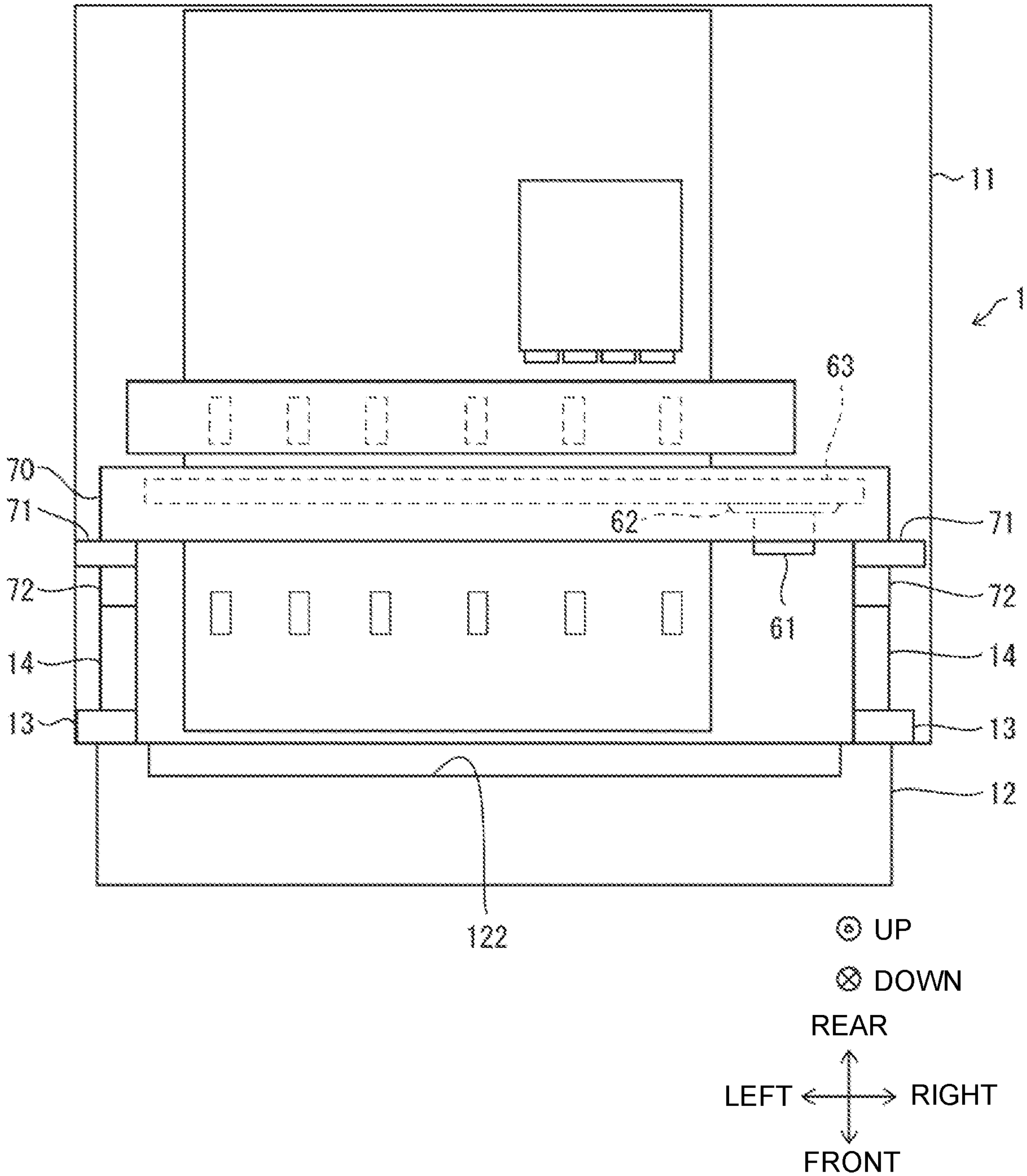
FIG. 4 is a view of the ink-jet printer 1 depicted in FIG. 3, as seen from thereabove.

The first position is a position of the cover 12 as depicted in FIGS. 1 and 2, and the second position is a position of the cover 12 as depicted in FIGS. 3 and 4. The opening 15 is located at a position at which the cover 12 is capable of releasing, to an outside of the casing 11, a part, in the installment part 44, on the downstream side in the conveying direction R1 of the sheet P, in a case that the cover 12 is moved to (located at) the second position.

<Configuration of Feed Tray 21 and Discharge Tray 22>

On the front wall 111, the feed tray 21 is provided to be detachably installed and the discharge tray 22 is provided. The feed tray 21 is configured to accommodate a plurality of pieces of the sheet P, and an upper surface of the feed tray 21 is opened. The discharge tray 22 is arranged at a location above the feed tray 21. A sheet P on which printing has been performed is discharged to the discharge tray 22.

<Configuration of Feeding Part 3>

The feeding part 3 has a rotation shaft 30, a feeding arm 31 and a feeding roller 32. The feeding roller 32 feeds, to a conveying route R, a sheet P accommodated in the feed tray 21. The feeding roller 32 is rotatably supported by a forward end part of the feeding arm 31. The feeding arm 31 is pivotably or rotatably supported by the rotation shaft 30 which is supported by a frame of the ink-jet printer 1.

The conveying route R is a route which extends upward from a rear end part of the feed tray 21, which is curved in an area thereof defined by a curved member 33, and which reaches the discharge tray 22 via the position of the printing part 4. In a case that a feeding motor (not depicted in the drawings) is driven, the feeding roller 32 is thereby caused to rotate normally and takes out, one by one, sheets P from the feed tray 21. Each of the sheets P taken out from the feed tray 21 is conveyed along the conveying route R, and toward the recording part 4.

<Configuration of Printing Part 4>

The recording part 4 is arranged at a location above the feeding part 3, and is configured to record an image on the sheet P. The recording part 4 is provided with a head carriage 40, the platen 43 and the installment part 44. In a case that a driving force of a head carriage motor (not depicted in the drawings) is transmitted to the head carriage 40, the head carriage 40 is reciprocally moved in the left-right direction, namely in a scanning direction. The head carriage 40 has a front part 404 and a rear part 405. The front part 404 is a part configured to hold the cartridge 46, and the rear part 405 is a part extending rearward from a rear end of the front part 404.

As depicted in FIG. 2, four pieces of the cartridge 46 which correspond, respectively, to magenta (M), cyan (C), yellow (Y) and black (K) in order from the left side are installed in the installment part 44. Note that an installment order of the four cartridges 46 is not limited to or restricted by this; it is allowable that the installment order is appropriately changed per each product or model of the ink-jet printer 1.

The installment part 44 is provided on the front part 404, at a part thereof which is opened on the front side. The installment part 44 is a part, in the front part 404 of the head carriage 40, in which the cartridges 46 are installed in a case that the cartridges 46 are installed in the installment part 44. A recessed part 401 is formed in the installment part 44. In the case that the cartridges 46 are installed in the installment part 44, a projected part 461 provided on a surface of each of the cartridges 46 fits into the recessed part 401. Note that in FIGS. 3, 5 to 7 and 9, the recessed part 401 and the projected part 461 are omitted.

The cartridges 46 are installable in the installment part 44 from the opening 15. The cartridges 46 are used for printing by the printing part 4. Each of the cartridge 46 has a liquid discharging head 41 and a liquid storing part 45. The liquid discharging head 41 is held by the front part 404 of the head carriage 40.

Note that each of the cartridges 46 may be a cartridge wherein a cartridge body having the liquid storing part 45 and the liquid discharging head 41 are integrally formed, or a cartridge wherein the liquid discharging head 41 is configured to be a body which is different and separable from the cartridge body. Further, the liquid discharging head 41 may be provided on the front part 404 of the head carriage 40. In this case, the printing part 4 has the liquid discharging head 41.

The liquid discharging head 41 has a plurality of nozzles 42 from which the ink is discharged or ejected. The plurality of nozzles 42 is provided on a lower surface of the liquid discharging head 41. The plurality of nozzles 42 are aligned in the front-rear direction to thereby form a nozzle row (nozzle array); the nozzle surface 421 has a plurality of pieces of the nozzle row formed therein and arranged side by side in the left-right direction. Black, yellow, cyan, and magenta inks are discharged from the plurality of nozzles 42, in an order from a nozzle row which is included in the plurality of nozzle rows and which is located on the left (leftmost) side in the left-right direction. Note that the order of arranging the nozzle rows is not limited to this; it is allowable to change the order of arrangement with respect to each product or model of the ink-jet printer 1.

The liquid discharging head 41 causes vibrating elements such as piezoelectric elements, etc., to vibrate to thereby discharge or eject, from the plurality of nozzles 42, the ink. The liquid discharging head 41 discharges or ejects the ink supplied from the liquid storing part 45 thereto via an ink channel 451. The liquid storing part 45 is configured to store the ink. The platen 43 is arranged at a location below the liquid discharging head 41. The platen 43 extends over an entire length in the left-right direction of the sheet P. The platen 43 supports the sheet P from therebelow at a time of a print processing.

The platen 43 is a member which has a shape of a rectangular plate and on which the sheet P is placed. In a process wherein the head carriage 40 moves with respect to the sheet P supported by the platen 43, the liquid discharging head 41 selectively discharges or ejects the ink to thereby print an image on the sheet P.

<Configuration of Conveyor 5>

The conveyor 5 has pinch rollers 50 and 53, a conveying roller 51, spur rollers 52 and 54, and a discharging roller 55. The conveying roller 51 and the conveying roller 53 are arranged so as to sandwich the liquid discharging head 44 therebetween in the front-rear direction. The conveying roller 51 is driven by a conveying motor (not depicted in the drawings).

The pinch roller 50 is provided at a location above the conveying roller 51 and at a position facing the conveying roller 51. The pinch roller 50 rotates accompanying with the rotation of the conveying roller 51. By the pinch roller 50 and the conveying roller 51 which are rotated normally, the sheet P is conveyed to the platen 43 along the conveying route R, while being pinched or held by the pinch roller 50 and the conveying roller 51.

The conveying roller 53 is provided on the downstream side in the conveying route R with respect to the liquid discharging head 41. The spur roller 52 is provided on a location above the conveying roller 53 and at a position facing the conveying roller 53. The conveying roller 53 is driven by a non-illustrated conveying motor.

The spur roller 52 rotates accompanying with the rotation of the conveying roller 53. By the spur roller 52 and the conveying roller 53 which are rotated normally, the sheet P is conveyed to the cutter unit 6 along the conveying route R, while being pinched or held by the spur roller 52 and the conveying roller 53. As depicted in FIG. 2, the spur roller 52 is provided as a plurality of spur rollers 52 arranged along the left-right direction. Further, the conveying roller 53 is also provided as a plurality of conveying rollers 53, corresponding to the plurality of spur rollers 52 on the one-to-one basis. The ink-jet printer 1 is provided with a holder 56 configured to hold the plurality of spur rollers 52.

The plurality of conveying rollers 53 and the discharging roller 55 are arranged so as to sandwich the cutter unit 6 therebetween in the front-rear direction. The discharging roller 55 is driven by the non-illustrated conveying motor. The spur roller 54 is provided at the location above the discharging roller 55 and at a position facing the discharging roller 55. The spur roller 54 rotates accompanying with a rotation of the discharging roller 55.

By the spur roller 54 and the discharging roller 55 which are rotated normally, the sheet P is discharged to the discharge tray 22 while being pinched or held by the spur roller 54 and the discharging roller 55. The sheet P pinched by the spur roller 54 and the discharging roller 55 is discharged to the discharge tray 22 passing through an opening 122 defined in the cover 12. As depicted in FIG. 2, the spur roller 54 is provided as a plurality of spur rollers 54 arranged along the left-right direction. Further, the discharging roller 55 is also provided as a plurality of discharging rollers 55 corresponding to the plurality of spur rollers 54 on the one-to-one basis. Note that the ink-jet printer 1 may be provided with a holder configured to hold the plurality of spur rollers 54.

<Configuration of Cutter Unit 6>

The cutter unit 6 has a cutter carriage 61, blades 62 and 63 and a cutter supporting part 64. The cutter unit 6 is arranged on the downstream side in the conveying direction of the sheet P, with respect to the printing part 4. The cutter unit 6 is an example of a "processing unit". The cutter carriage 61 moves reciprocally in the left-right direction by a driving force transmitted thereto from a non-illustrated cutter carriage motor. The cutter carriage 61 holds the blade 62. The blade 62 is, for example, a round blade, and is rotatably held by the cutter carriage 61. The cutter carriage 61 is arranged at a location above the conveying route 61.

The cutter supporting part 64 is configured to hold the blade 63 and is provided so as to extend in the left-right direction. The cutter supporting part 64 is arranged at a location below the conveying route R. As depicted in FIG. 2, the blade 63 is, for example, a fixed blade provided to extend in the left-right direction. The blade 63 is formed have a shape of a letter "L". The blade 63 is fixed to the cutter supporting part 64. The blades 62 and 63 are each an example of a "processing part" configured to process a sheet P having an image printed thereon by the printing part 4. Note that regarding the cutter unit 6, it is allowable that the cutter carriage 61 is arranged at the location below the conveying route R and that the cutter supporting part 64 is arranged at the location above the conveying route R. Namely, in the up-down direction, the blade which is the round blade is arranged at the loser side, and that the blade 63 which is the fixed blade is arranged at the upper side.

The cutter unit 6 is configured to cut, with the blades 62 and 63, the sheet P completely into two sheets by causing the cutter carriage 61 to move reciprocally in the left-right direction. Note that the present disclosure is not limited to or restricted by this case. For example, it is also allowable that the ink-jet printer 1 is provided with a processing unit configured to execute a creasing processing of imparting a creasing with respect to the sheet P or that the ink-jet printer 1 is provided with a processing unit configured to execute a perforating processing of imparting a perforation with respect to the sheet P, instead of the cutter unit 6. In such a case that the ink-jet printer 1 is provided with these processing units, the ink-jet printer 1 is provided with a processing part configured to impart the creasing to the sheet P, and/or a processing part configured to impart the perforation to the sheet P.

<Configuration Around Shielding Part 70>

The ink-jet printer 1 is provided with a rotation shaft 13, a first contact part 14, a shielding part 70, a rotation shaft 71 and a second contact part 72. The first contact part 14 is provided on the cover 12. Accompanying with a first action in which the cover 12 is moved from the first position to the second position, the first contact part 14 rotates while maintaining a relative position of the first contact part 14 with respect to the cover 12. In this case, the cover 12 and the first contact part 14 move from a position depicted in FIGS. 1 and 2 to a position depicted in FIGS. 3 and 4. The first action is an action (operation) by which the cover 12 is opened.

As depicted in FIG. 2, two pieces of the first contact part 14 are provided on the inside of the casing 11. The two first contact parts 14 are provided, respectively, on the left side and the right side of the cover 12. Since the first contact parts 14 are not present in the vicinity of the center in the left-right direction of the cover 12, and thus in a case that the first contact parts 14 are rotated, the first contact parts 14 do not make contact with the discharging rollers 55. Further, the cover 12 is provided to extend in the left-right direction. An angle defined between an extending surface of the cover 12 and an extending surface of each of the first contact parts 14 is, for example, 90 degrees. Two pieces of the rotation shaft 13 are provided on the inside of the casing 11. The two rotation shafts 13 are provided, respectively, on the left side and the right side of the cover 12.

The shielding part 70 is provided rotatably on the inside of the casing 11. Specifically, the shielding part 70 is provided rotatably on the rotation shaft 71. The rotation shaft 71 is arranged, in the front-rear direction, between the cutter unit 6 and the plurality of spur rollers 54. The rotation shaft 71 is configured to rotates the shielding part 70 and the second contact part 72. The second contact part 72 is provided on the rotation shaft 71, and rotate accompanying with the rotation of the shielding part 70. Specifically, the second contact part 72 rotates while maintaining a relative position of the second contact part 72 with respect to the shielding part 70. The second contact part 72 and the shielding part 70 may be arranged together along a same plane.

As depicted in FIG. 2, the shielding part 70 is provided to extend in the left-right direction. Two pieces of the second contact part 72 are provided on the inside of the casing 11. The two second contact parts 72 are provided, respectively, on the left side and the right side of the casing 11. Since the second contact parts 72 are not present in the vicinity of the center in the left-right direction of the casing 11, and thus in a case that the second contact parts 72 are rotated, the second contact parts 72 do not make contact with the plurality of spur rollers 54, the plurality of discharging rollers 55 and the cutter unit 6.

Two pieces of the rotation shaft 71 are provided on the inside of the casing 11. The two rotation shafts 71 are provided, respectively, on the left side and the right side of the casing 11. The rotation shafts 71 are not present in the vicinity of the center in the left-right direction of the casing 11. In a case that the cover 12 is moved to (positioned at) the first position, the shielding part 70 is arranged at a location above the first contact parts 14.

Accompanying with the first action of the cover 12, the shielding part 70 makes contact with the first contact parts 14 and rotates, and thereby moves from a contact position at which the shielding part 70 is capable of making contact with the first contact parts 14 to a shielding position at which the shielding part 70 shields at least a part of the cutter unit 6 from the outside of the casing 11. In this situation, the second contact parts 72 also rotate accompanying with the rotation of the shielding part 70. Specifically, each of the shielding part 70 and the second contact parts 72 moves from a position thereof depicted in FIGS. 1 and 2 to a position depicted in FIGS. 3 and 4.

The contact position is a position of the shielding part 70 as depicted in FIGS. 1 and 2, and the shielding position is a position of the shielding part 70 as depicted in FIGS. 3 and 4. In a case that the shielding part 70 is positioned at the shielding position, the cover 12 is positioned at the second position, and the shielding part 70 shield at least a part of the cutter unit 6 from the outside of the casing 11. In a case that the cover 12 is positioned at the second position, the shielding part 70 is arranged at the location above the cutter unit 6, and the second contact parts 72 are arranged at the location below the first contact parts 14. As depicted in FIG. 4, for example, the shielding part 70 shields the blades 62 and 63 as seen thereabove and covers the part of the cutter carriage 61.

In the case that the user moves the cover 12 from the first position to the second position and exchanges a cartridge 46, the cartridge 46 is exposed from the opening 15 formed in the casing 11. In this case, there is provided a state that at least the part of the cutter unit 6 is shielded, by the shielding part 70, from the outside of the casing 11.

In the case that the cover 12 is positioned at the second position at which the cover 12 releases the opening 15, the shielding part 70 shields at least the part of the cutter unit 6 from the outside of the casing 11. Accordingly, in the case that the cartridge 46 is to be exchanged, it is possible to prevent, by the shielding part 70, any access to the cutter unit 6. Further, with a simple configuration that the shielding part 70 is arranged to be rotatable in the inside of the casing 11, it is possible to provide the state, in the case that the cover 12 is opened, that the shielding part 70 shields at least the part of the cutter unit 6.

Accompanying with a second action in which the cover 12 is moved from the second position to the first position, the second contact parts 72 make contact with the first contact parts 14 and rotate, thereby causing the shielding part 70 to move from the shielding position to the contact position. Specifically, each of the shielding part 70 and the second contact parts 72 moves from the position thereof depicted in FIGS. 3 and 4 to the position thereof depicted in FIGS. 1 and 2. The second action is an action (operation) by which the cover 12 is closed.

Accompanying with the action by which the cover 12 is closed, the shielding part 70 returns from the shielding position to the contact position. Accordingly, in a case that the cover 12 is opened again, the shielding part 70 moves from the contact position to the shielding position, thereby making it possible to provide the state that the shielding part 70 covers at least the part of the cutter unit 6. Namely, accompanying with the opening/closing action of the cover 12, the shielding part 70 is capable of repeating the movement between the contact position and the shielding position.

As described above, the shielding part 70 moves, accompanying with the first action in which the cover 12 moves from the first position to the second position, so that the shielding part 70 shields at least the part of the cutter unit 6 from the outside of the casing 11.

Accompanying with the first action of the cover 12, the shielding part 70 moves so that the shielding part 70 shields at least the part of the cutter unit 6 from the outside of the casing 11. Accordingly, in a case that the cover 12 is opened, there is provided a state that at least the part of the cutter unit 6 is shielded by the shielding part 70. Therefore, in the case that the cover 12 is opened and the cartridge 46 is to be exchanged, it is possible to prevent, by the shielding part 70, any access to the cutter unit 6.

<Regarding Shielding>

In the present disclosure, the term "shield, shielding" means that the shielding part 70 shields at least a part of the cutter unit 6 from the outside of the casing 11, as visually confirming from a wall, of the casing 11, from which the cartridge 46 is installed in the installment part 44. The wall, of the casing 11, from which the cartridge 46 is installed in the installment part 44 is the front wall 111 in FIG. 1, and an upper wall 112 in FIG. 11. More specifically, the term "shield, shielding" means that, in a case that the user performs an exchanging operation of the cartridge 46, the shielding part 70 shield at least the part of the cutter unit 6 from the outside of the casing 11, in a visual line (line of sight) in which the user accesses the installment part 44 from the outside of the casing 11.

<Configuration Around Supporting Frame 80>

The ink-jet printer 1 is provided with the supporting frame 80 and the sheet metal 83. The supporting frame 80 is provided to extend in the left-right direction, and movably supports the head carriage 40. A lower end part 81 of the supporting frame 80 fits into a recessed part 402 formed in a rear end surface of the front part 404 of the head carriage 40. An upper end part 82 of the supporting frame 80 fits into a recessed part 403 formed in a lower end of a rear part of the rear part 405 of the head carriage 40. The head carriage 40 moves reciprocally in the left-right direction along the supporting frame 80. The sheet metal 83 supports the pinch roller 50 and supports the supporting frame 80.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

First Modification

The cover 12 may be configured to move in the up-down direction with respect to the front wall 111 of the casing 11 to thereby perform the opening and closing. In this case, accompanying with the first action of the cover 12, namely, an action of the cover 12 to move upward from the first position, the first contact parts 14 move upward while maintaining the relative position of the first contact parts 14 with respect to the cover 12. By the upward movement of the first contact parts 14, the first contact parts 14 make contact with the shielding part 70. With this, the shielding part 70 makes contact with the first contact parts 14 and rotates.

Further, accompanying with the second action of the cover 12, namely, an action of the cover 12 to move downward from the second position, the first contact parts 14 move downward while maintaining the relative position of the first contact parts 14 with respect to the cover 12. By the downward movement of the first contact parts 14, the second contact parts 72 make contact with the first contact parts 14 and rotate.

Note that the cover 12 may be configured to move in the up-down direction with respect to the front wall 111 of the casing 11 to thereby perform the opening and closing and to be removable (detachable) from the casing 11. In this case, by moving the cover 12 in the up-down direction, the cover 12 is detachable from the casing 11.

Second Modification

The shielding part 70 may function as the holder configured to hold the plurality of spur roller 54. In this case, in a situation that the shielding part 70 makes contact with the first contacting parts 14 accompanying with the first action of the cover 12, the shielding part 70 rotates in a state that the shielding part 70 holds the plurality of spur rollers 54. Namely, the plurality of spur rollers 54 move accompanying with the rotation of the shielding part 70.

Further, in a case that the second contact parts 70 make contact with the first contact parts 14, accompanying with the second action of the cover 12, the shielding part 70 rotates in a state that the shielding part 70 holds the plurality of spur rollers 54. Namely, the plurality of spur rollers 54 return to the original position accompanying with the rotation of the shielding part 70. With the above-described configuration, the shielding part 70 is capable of providing both of a function of shielding at least the part of the cutter unit 6 and a function of holding the plurality of spur rollers 54.

Third Modification

It is allowable that the ink-jet printer 1 is not provided with the first contact parts 14, the shielding part 70, the rotation shafts 71 and the second contact parts 72. In this case, a part on the lower side with respect to the opening 15 in the front wall 111 shields at least the part of the cutter unit 6 from the outside of the casing 111. The part on the lower side with respect to the opening 15 in the front wall 111 is a part of the front wall 111 and an example of the shielding part.

Since at least the part of the cutter unit 6 can be shielded by the shielding part which is a part of the front wall 111 of the casing 11, there is no need to newly provide a member configured to shield the cuter unit 6. Accordingly, the manufacturing cost of the ink-jet printer 1 can be reduced.

Fourth Modification

An ink-jet printer 1A according to a fourth modification will be explained, with reference to FIGS. 5 and 6. As compared with the ink-jet printer 1, the ink-jet printer 1A is different from the ink-jet printer 1 in view of a point that the ink-jet printer 1A is not provided with the first contacting parts 14, the spur rollers 54, the discharging rollers 55, the shielding part 70, the rotation shafts 71 and the second contact parts 72.

Further, as compared with the ink-jet printer 1, the ink-jet printer 1A is different from the ink-jet printer 1 in view of a point that the cover 12 is changed to the cover 12A and the cutter unit 6 is changed to a cutter unit 6A. Furthermore, the ink-jet printer 1A is different from the ink-jet printer 1 in view of that the ink-jet printer 1A is provided with a shielding part 70A, a connecting member 73, a rotation shaft 74 and a supporting shaft 76.

Figure 5:
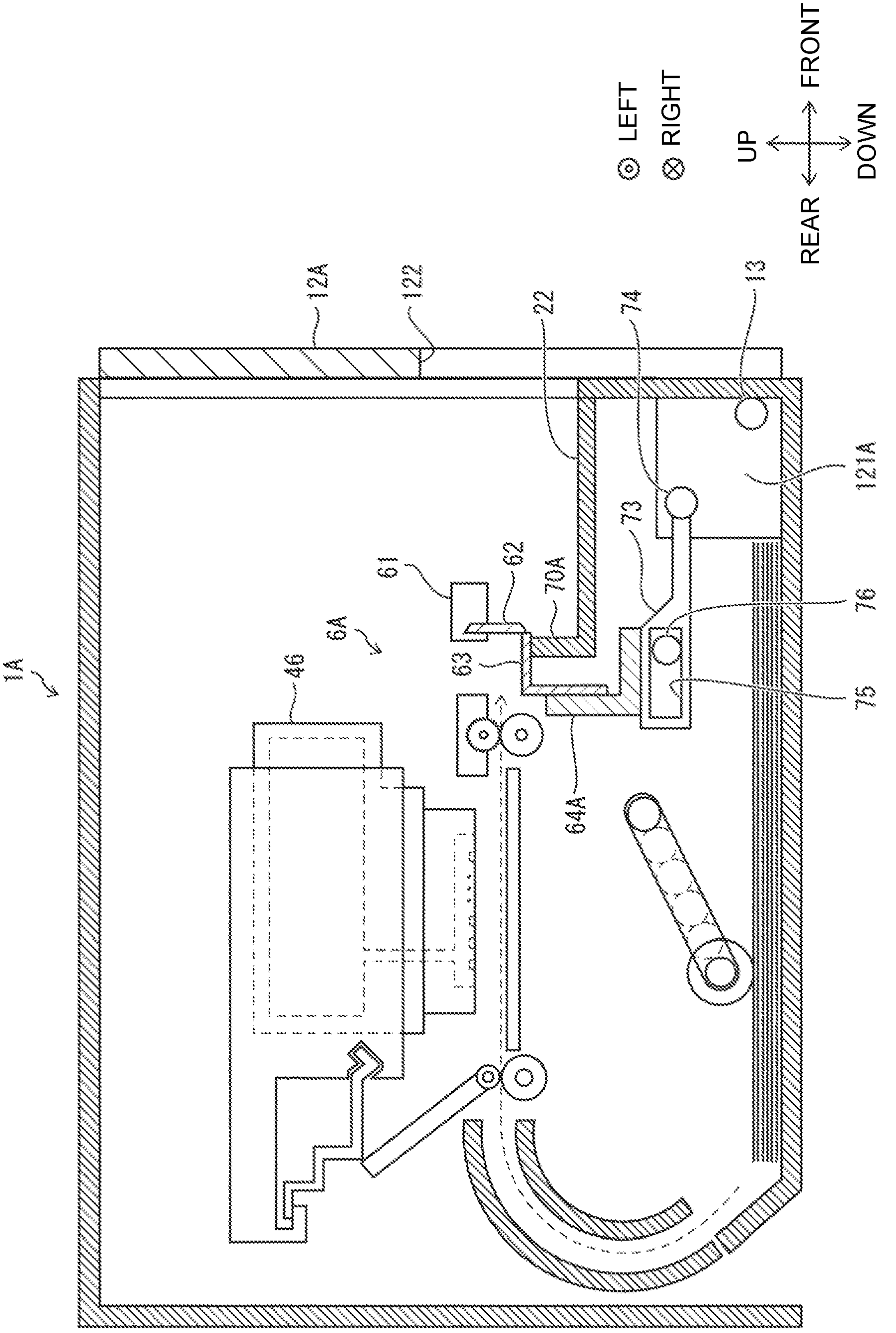
FIG. 5 is a cross-sectional view depicting an example of the internal configuration of an ink-jet printer 1A.

As depicted in FIG. 5, the cover 12A has a flat part (flat surface part) 121A. Two pieces of the flat part 121A are provided on the inside of the casing 11. The two flat parts 121A are provided, respectively, on the left side and the right side of the casing 11. The flat parts 121A are rotatably provided on the rotation shaft 13.

The connecting member 73 is a member configured to connect a cutter supporting part 64A and each of the flat parts 121A. The connecting member 73 is provided on each of the flat parts 121A via the rotation shaft 74. An opening 75 is defined (formed) in the connecting part 73, and there is provided a state that the supporting shaft 76 enters into the opening 75. By the supporting shaft 76 entering into the opening 75, the supporting shaft 76 thereby supports the connecting part 73. The supporting shaft 76 is fixed to a frame of the ink-jet printer 1A.

As compared with the cutter unit 6, the cutter unit 6A is different from the cutter unit 6 in view of a point that the cutter supporting part 64 is changed to the cutter supporting part 64A. The cutter supporting part 64A supports the blade 63. A lower surface of the cutter supporting part 64A is fixed to an upper surface of the connecting member 73. A part, of the sheet P which has been cut by the cutter unit 6A, is arranged to the outside of the casing 11 via an opening 122 formed (defined) in the cover 12A, and the sheet P is discharged to an discharge tray 22.

Figure 6:
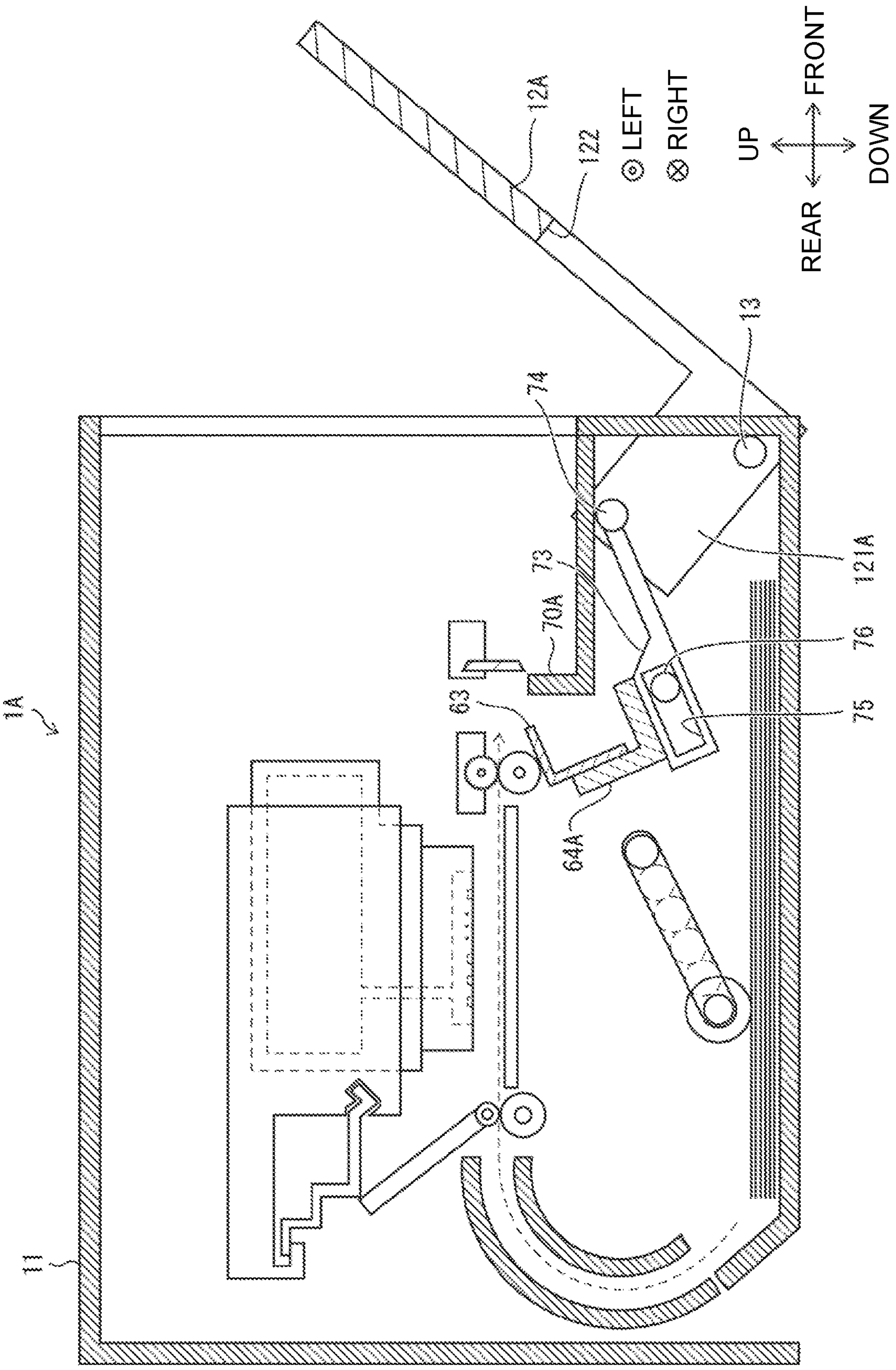
FIG. 6 is a cross-sectional view depicting a state that a cover is opened in the ink-jet printer 1A depicted in FIG. 5.

As depicted in FIG. 6, accompanying with the first action of the cover 12A, the flat parts 121A rotate with respect to the casing 11, and the connecting member 73 rotates with respect to the flat parts 121A. With this, the blade 63 and the cutter supporting pert 64A move so as to fall rearward. By the rotation of the connecting member 73, the relative position of the connecting member 73 with respect to the support shaft 76 is changed.

Further, by the movement of each of the blade 63 and the cutter supporting part 64A, the blade 63 is shielded by the shielding part 70A. The shielding part 70A is provided on the rear side with respect to the discharge tray 22 and extends in the up-down direction. In such a manner, the blade 63 and the cutter supporting part 64A of the cutter unit 6A move, accompanying with the first action in which the cover 12A moves from the first position to the second position, so that the shielding part 70A shields at least the part of the cutter unit 6A from the outside of the casing 11.

Accordingly, in the case that the cover 12A is opened, there is provided a state that at least the part of the cutter unit 6A is shielded by the shielding part 70A. Accordingly, in the case that the cover 12A is opened and the cartridge 46 is to be exchanged, it is possible to prevent, by the shielding part 70A, any access to the cutter unit 6A.

Fifth Modification

An ink-jet printer 1B according to a fifth modification will be explained, with reference to FIGS. 7 to 9.

Figure 7:
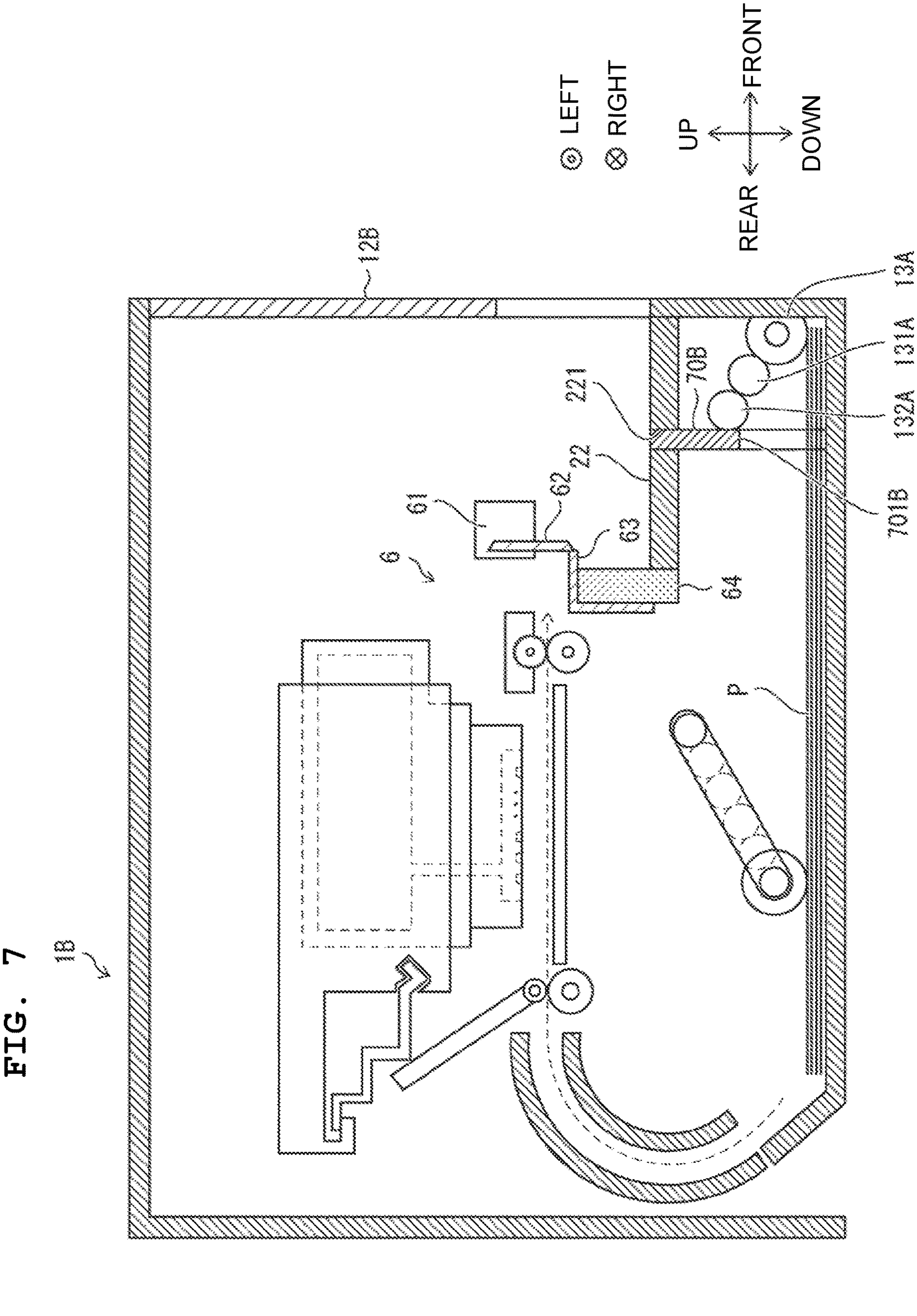
FIG. 7 is a cross-sectional view depicting an example of the internal configuration of an ink-jet printer 1B.
Figure 8:
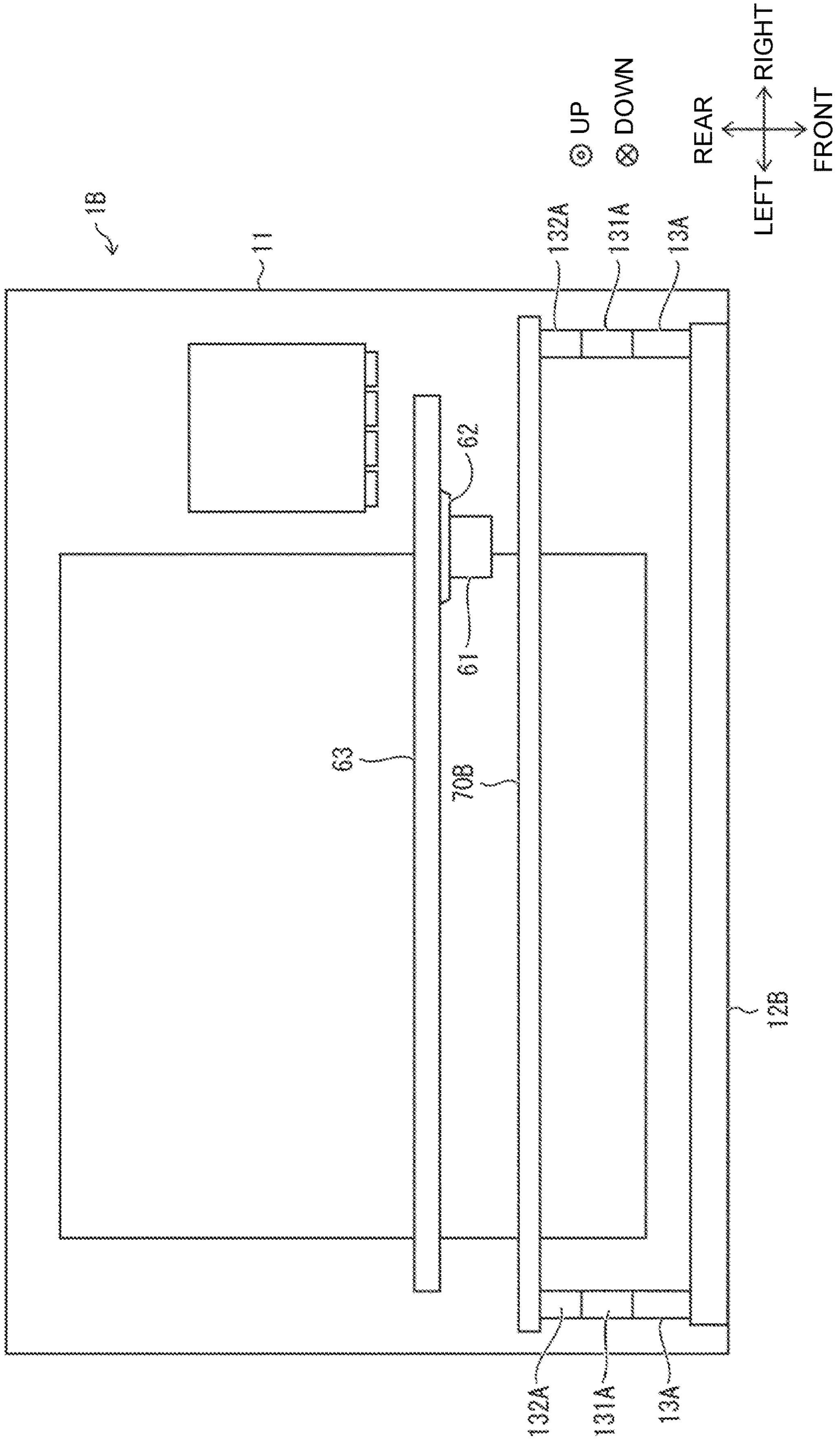
FIG. 8 is a view of the ink-jet printer 1B depicted in FIG. 7, as seen from thereabove.
Figure 9:
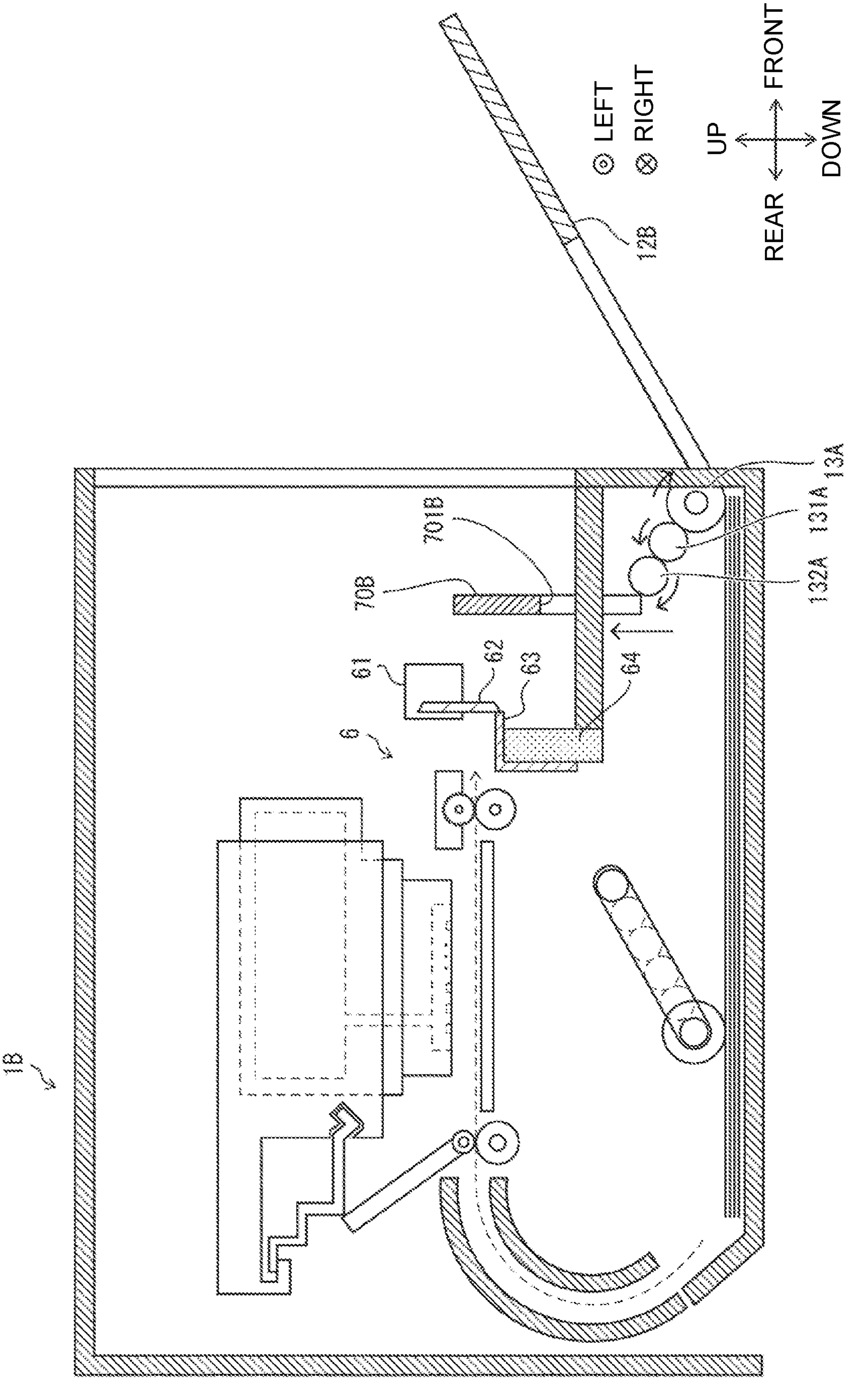
FIG. 9 is a cross-sectional view depicting a state that a cover is opened in the ink-jet printer 1B depicted in FIG. 7.

As depicted in FIGS. 7 to 9, as compared with the ink-jet printer 1, the ink-jet printer 1B is different from the ink-jet printer 1 in view of a point that the ink-jet printer 1B is not provided with the first contacting parts 14, the spur rollers 54, the discharging rollers 55, the shielding part 70, the rotation shafts 71 and the second contact parts 72. Note that in FIGS. 7 to 9, the discharge tray 22 is omitted. As depicted in FIG. 7, an opening 701B is formed (defined) in a shielding part 70B, and in a state that a cover 12B is closed, a sheet P is arranged in the inside of the opening 701B.

Further, as compared with the ink-jet printer 1, the ink-jet printer 1B is different from the ink-jet printer 1 in view of a point that the cover 12 is changed to the cover 12B, and a point that the rotation shaft 13 is changed to a rotation shaft 13A. Further, as compared with the ink-jet printer 1, the ink-jet printer 1B is different from the ink-jet printer 1 in view of a point that the ink-jet printer 1B is provided with the shielding part 70B and gears 131A and 131B.

As depicted in FIG. 8, the shielding part 70B is provided to extend in the left-right direction. Two pieces of the rotation shaft 13A are provided on the inside of the casing 11. The two rotation shafts 13A are provided, respectively, on the left side and the right side of the inside of the casing 11. The rotation shafts 13A are not present in the vicinity of the center in the left-right direction of the casing 11.

Two pieces of the gear 131A are provided on the inside of the casing 11. The two gears 131A are provided, respectively, on the left side and the right side of the inside of the casing 11. The gears 131A are not present in the vicinity of the center in the left-right direction of the casing 11. Two pieces of the gear 132A are provided on the inside of the casing 11. The two gears 132A are provided, respectively, on the left side and the right side of the inside of the casing 11. The gears 132A are not present in the vicinity of the center in the left-right direction of the casing 11.

As depicted in FIG. 9, the rotation shafts 13A rotate accompanying with the first action of the cover 12B, which in turn causes the gears 131A to also rotate accompanying with the rotation of the rotation shafts 13A, thereby causing the gears 132A to also rotate accompanying with the rotation of the gears 131A. With this, the shielding part 70B moves upward accompanying with the rotation of the gears 132A, while making contact with the gears 132A. By the upward movement of the shielding part 70B, the blades 62 and 63 and the cutter supporting part 64 are shielded by the shielding part 70B.

In a case that the shielding part 70B moves upward, the shielding part 70B passes through an opening 221 formed in the discharge tray 22 and moves up to a position at which the shielding part 70B shields the blades 62 and 63 and the cutter supporting part 64. In this case, a hatched part in the shielding part 70B is inserted into the opening 221.

Sixth Modification

An ink-jet printer 1C according to a sixth modification will be explained, with reference to FIGS. 10A to 10C.

As compared with the ink-jet printer 1, an ink-jet printer according to the sixth modification is different from the ink-jet printer 1 in view of a point that the ink-jet printer is not provided with the first contacting parts 14, the shielding part 70, the rotation shafts 71 and the second contact parts 72. Further, as compared with the ink-jet printer 1, the ink-jet printer according to the sixth modification is different from the ink jet printer 1 in view of a point that the cutter unit 6 is changed to a cutter unit 6B and a point that the ink-jet printer is provided with a shielding part 70C.

Figure 10A:
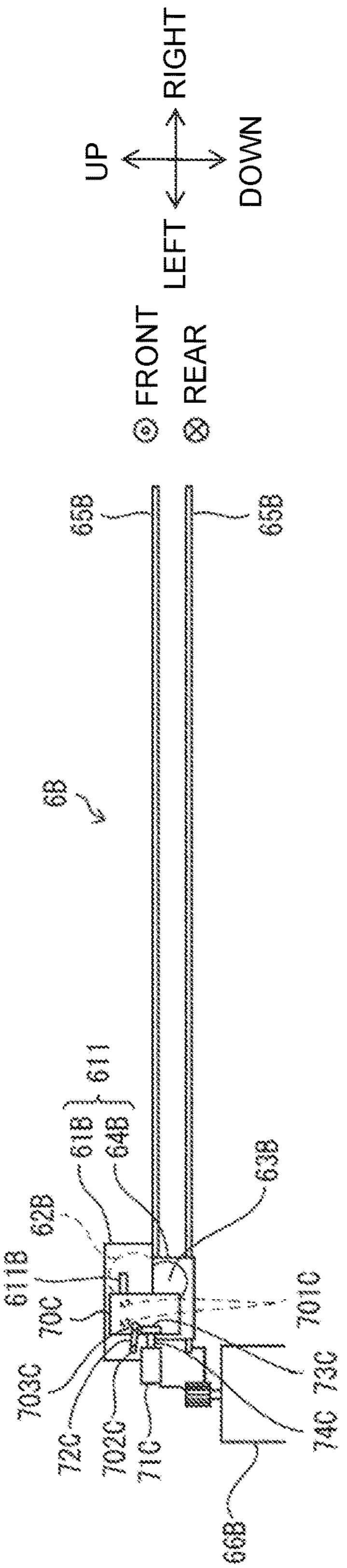
FIGS. 10A, 10B and 10C are each a view depicting an example of the configuration of a cutter unit 6B.
Figure 10B:
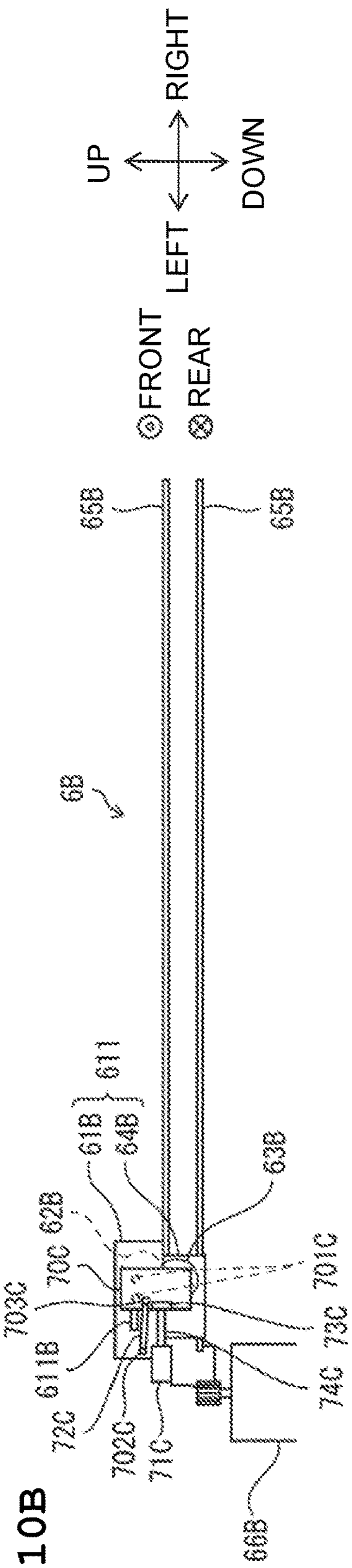
Figure 10C:
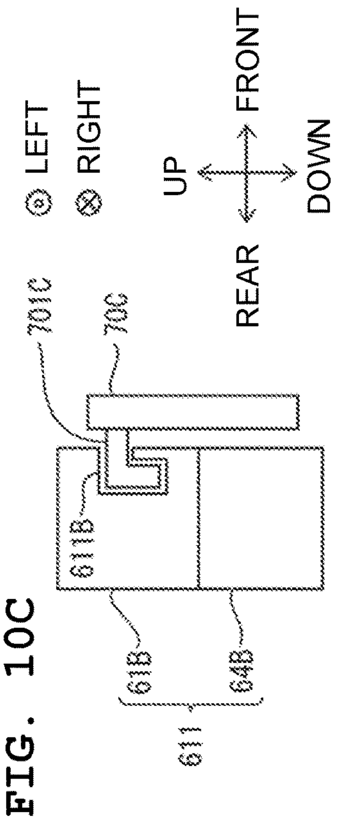

As depicted in FIG. 10A, the cutter unit 6B is provided with a cutter carriage 611, blades 62B and 63B, a supporting member 65B and an electric motor 66B. The cutter carriage 611 is constructed of an upper part 61B and a lower part 64B. The upper part 61B rotatably supports the blade 62B, and the lower part 64B rotatably supports the blade 63B. Each of the blades 62B and 63B is, for example, a round blade. The supporting member 65B is a member configured to movably support the cutter carriage 611 and is provided to extend in the left-right direction.

The cutter unit 6B has an endless driving belt (not depicted in the drawings) which is wound around non-illustrated two pulleys. The cutter carriage 611 is connected to the driving belt. One of the two pulleys is connected to the electric motor 66B. In a case that the electric motor 66B is driven, the pulley connected to the electric motor 66B is thereby rotated, which in turn rotates also the driving belt. With this, the cutter carriage 611 reciprocally moves in the left-right direction along the supporting member 65B, thereby allowing the cutter unit 6B to cut the sheet P with the blades 62B and 63B.

A recessed part 611B is formed, in a surface on the front side in the upper part 61B, so that the recessed part 611B extends in the left-right direction. As depicted in FIG. 10C, a projected part 701C provided on a surface on the rear side in the shielding part 70C fits into the recessed part 611B such that the projected part 701C is caught in the recessed part 611B.

A projected part 703C and a projected part 73C are formed in a surface on the front side in the shielding part 70C. A projected part 702C and an electric actuator 71C are provided on a surface on the front side in the upper part 61B. The projected part 702C and the projected part 703C are connected via an elastic member 72C. The elastic member 72C is, for example, a spring or rubber.

The ink-jet printer according to the sixth modification is provided with a non-illustrated cover sensor which is attached to an inner wall of the casing 11 and which is configured to detect opening and closing of the cover 12. In a case that the cover sensor detects that the cover 12 is opened, the electric actuator 71C moves the projected part 74C rightward, thereby causing the projected part 73C to move rightward while causing the projected part 74C to make contact with the projected part 73C. With this, the shielding part 70C moves rightward and at least a part of each of the blades 62C and 63B is shielded by the shielding part 70C.

Further, in a case that the cover sensor detects that the cover 12 is closed, the electric actuator 71C moves the projected part 74C leftward. With this, the elastic member 72C is contracted to thereby pulls the projected part 703C to approach closer to the projected part 702C, which in turn causes the shielding part 70C to move leftward and to return to an original position.

Note that the electric actuator 71C may be provided on the supporting member 65B. In this case, in a case that the cutter carriage 611 is at a standby position, the electric actuator 71C is capable of causing the projected part 74C to make contact with the projected part 73C. The standby position is a position at which the sheet P has not reached the cutter unit 6B yet, or a position at which the cutter unit 6B stands by in a case that cutting of the sheet P by the cutter unit 6B has completed.

Second Embodiment

<Configuration of Ink-Jet Printer 1C>

A second embodiment of the present disclosure will be explained below, with reference to FIG. 11. Note that for the sake of convenience of explanation, same reference numerals are affixed to members, of the second embodiment, which have the same functions as those of the members explained in the first embodiment, and the explanation therefor will not be repeated.

Figure 11:
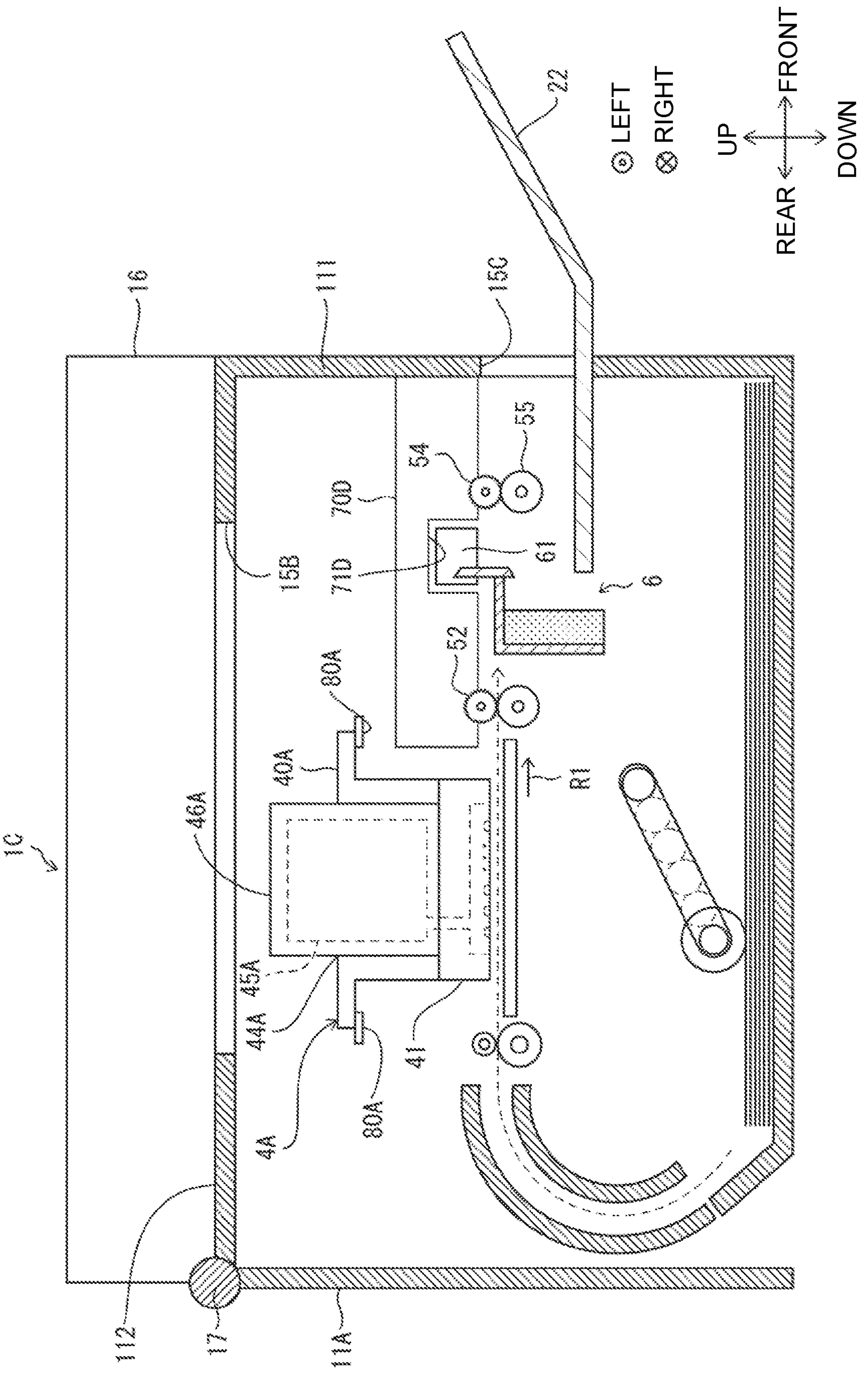
FIG. 11 is a cross-sectional view depicting an example of the internal configuration of an ink-jet printer 1C.

As depicted in FIG. 11, as compared with the ink-jet printer 1, an ink-jet printer 1C according to the second embodiment is different from the ink-jet printer 1 in view of a point that the printing part 4 is changed to a printing part 4A, a point that the supporting frame 80 is changed to a supporting frame 80A and a point that the sheet metal 83 is not provided. Further, as compared with the ink-jet printer 1, the ink-jet printer 1C according to the second embodiment is different from the ink-jet printer 1 in view of a point that the ink-jet printer 1C is not provided with the cover 12, the rotation shafts 13, the first contacting parts 14, the shielding part 70, the rotation shafts 71 and the second contact parts 72.

Furthermore, as compared with the ink-jet printer 1, the ink-jet printer 1C is different from the ink-jet printer 1 in view of a point that the casing 11 is changed to a casing 11A, a point that the ink-jet printer 1C is provided with a scanner unit 16 and a rotation shaft 17, and a point that the holder 56 is changed to a holder 70D.

<Configurations of Casing 11 and Scanner Unit 16>

As compared with the casing 11, the casing 11A is different from the casing 11 in view of a point that an opening 15B is formed in an upper wall 112. The scanner unit 16 is provided on the upper wall 112 of the casing 11A. The scanner unit 16 is provided to be movable to a first position at which the scanner unit 16 covers the opening 15B, and to a second position at which the scanner unit 16 releases or opens the opening 15B. Specifically, the scanner unit 16 is provided to be rotatable with respect to the upper wall 112 via the rotation shaft 17. The scanner unit 16 is an example of the "opening/closing part". Note that it is allowable that the cover 12 depicted in FIG. 1 is provided on the upper wall 112, rather than the scanner unit 16.

The opening 15B is formed at a position at which the opening 15B is capable of releasing a location above the installment part 44A in a case that the scanner unit 16 is at the second position. The scanner unit 16 reads an image printed on a manuscript (original) placed on a light transmittable (optically transparent) member such as a glass plate, etc., by a reading part which is, for example, a CIS (Contact Image Sensor), etc., and converts the read image into image data.

<Configuration of Printing Part 4A>

As compared with the printing part 4, the printing part 4A is different from the printing part 4 in view of a point that the head carriage 40 is changed to a head carriage 40A, a point that the installment part 44 is changed to an installment part 44A and a point that the printing part 4A is provided with a liquid discharging head 41. In a case that a driving force of a non-illustrated head carriage motor is transmitted to the head carriage 40A, the head carriage 40A moves reciprocally in the left-right direction along the supporting frame 80A. The supporting frame 80A is provided to extend in the left-right direction and movably supports the head carriage 40A. Two pieces of the supporting frame 80 are provided.

The installment part 44A is provided on the upper side with respect to the head carriage 40A. The installment part 44A is a part which is between the head carriage 40A and the cartridge 46A in a case that the cartridge 46A is installed in the installment part 44A. The cartridge 46A is installable in the installment part 44A from the opening 15B.

The cartridge 46A is configured to be used in a printing by the printing part 4A. The cartridge 46A has a liquid storing part 45A. The liquid discharging head 41 is provided on the head carriage 40A.

Note that it is allowable that the liquid discharging head 41 is provided on the cartridge 46A. In this case, the printing part 4 does not have the liquid discharging head 41. Further, the cartridge 46A may be a cartridge in which a cartridge body having the liquid storing part 45A and the liquid discharging head 41 are integrally formed, or the cartridge 46A may be a cartridge wherein the liquid discharging head 41 is a separate body and separable with respect to the cartridge body.

<Configuration of Holder 70D>

The holder 70D is an example of the "shielding part" and holds spur rollers 52 and 54. A recessed part 71D is formed in a lower surface of the holder 70D, and a cutter carriage 61 is arranged in a space surrounded by the recessed part 71D. The spur rollers 52 and 54 are each an example of a "guide member" which guides, in the conveying direction R1, a sheet P having an image recorded thereon by the printing part 4A.

Further, the holder 70D shields at least a part of the cutter unit 6 from the outside of the casing 11A. For example, the holder 70D may cover a location above the cutter unit 6. The holder 70D provides both of a function of holding the spur rollers 52 and 54 and a function of shielding at least the part of the cutter unit 6 from the outside of the casing 11A.

It is possible to shield at least the part of the cutter unit 6 by the holder 70D configured to hold the spur rollers 52 and 54 which guide the sheet P to the conveying direction R1, and thus there is no need to newly provide a member configured to shield the cutter unit 6. Accordingly, the manufacturing cost of the ink-jet printer 1C can be reduced.

By normal rotation of each of the spur rollers 54 and the discharging rollers 55, the sheet P is discharged to the discharge tray 22, while being pinched or held by the spur rollers 54 and the discharging rollers 55. In this situation, the sheet P is discharged to the discharge tray 22 from an opening 15C formed in a front wall 111 of the casing 11A.

Seventh Modification

Figure 12:
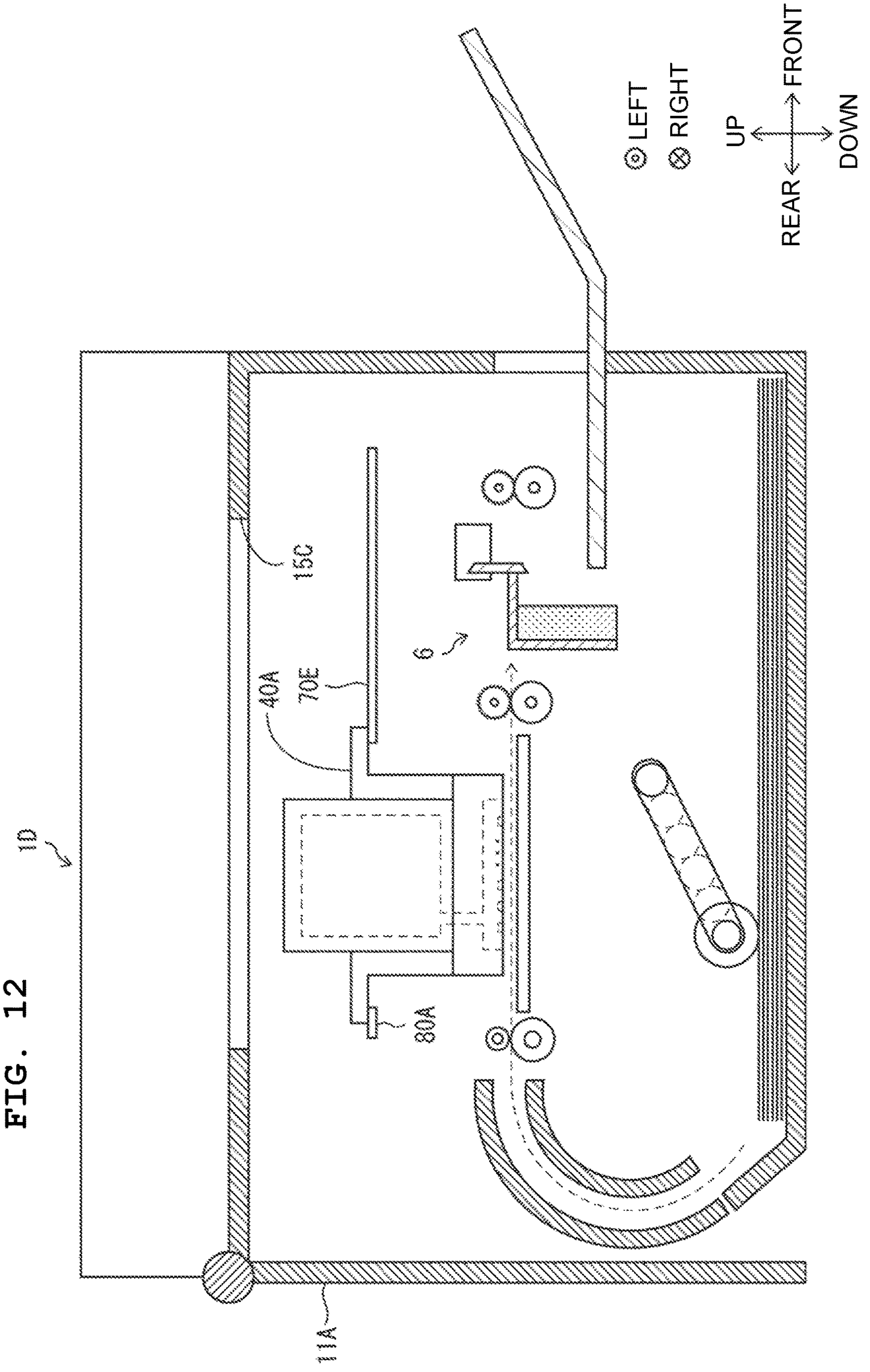
FIG. 12 is a cross-sectional view depicting an example of the internal configuration of an ink-jet printer 1D.

An ink-jet printer 1D according to a seventh modification of the present disclosure will be explained, with reference to FIG. 12. As depicted in FIG. 12, as compared with the ink-jet printer 1C, the ink-jet printer 1D is different from the ink-jet printer 1C in view of a point that among the two supporting frames 80A, a supporting frame 80A on the front side is changed to a supporting frame 70E, and a point that the ink-jet printer 1D is not provided with the holder 70D.

The supporting frame 70E extends in the front-rear direction to a great extent, as compared with the supporting frame 80A, and shields at least a part of the cutter unit 6 from the outside of the casing 11A. The supporting frame 70E is an example of the "shielding part". The supporting frame 70E may cover a location above the cutter unit 6. The supporting frame 70E is provided to extend in the left-right direction, and movably supports a head carriage 40A.

Since at least the part of the cutter unit 6 can be shielded by the supporting frame 70E which movably supports the head carriage 40A, there is no need to newly provided a member configured to shield the cuter unit 6. Accordingly, the manufacturing cost of the ink-jet printer 1D can be reduced.

Eighth Modification

Figure 13:
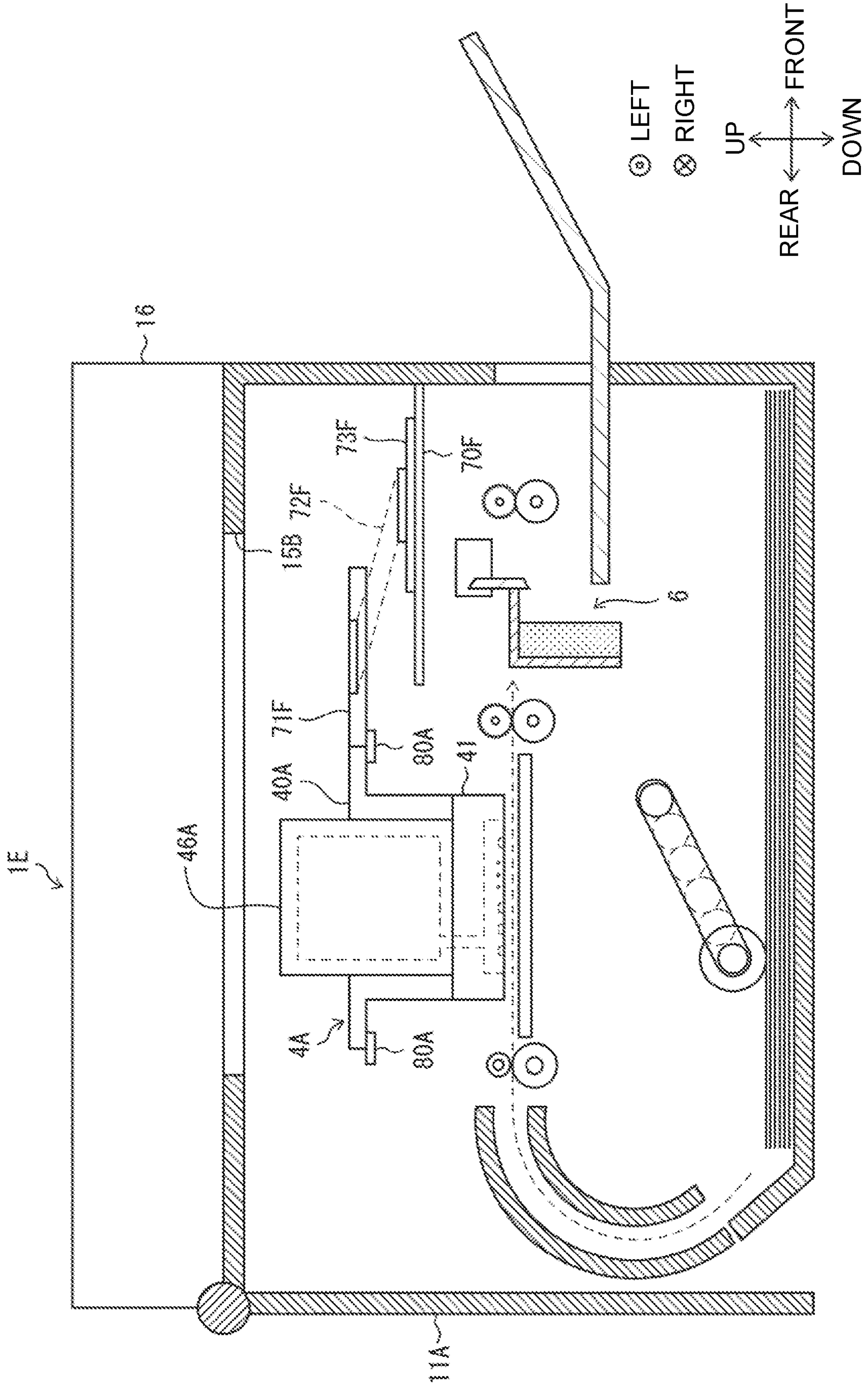
FIG. 13 is a cross-sectional view depicting an example of the internal configuration of an ink-jet printer 1E.
Figure 14:
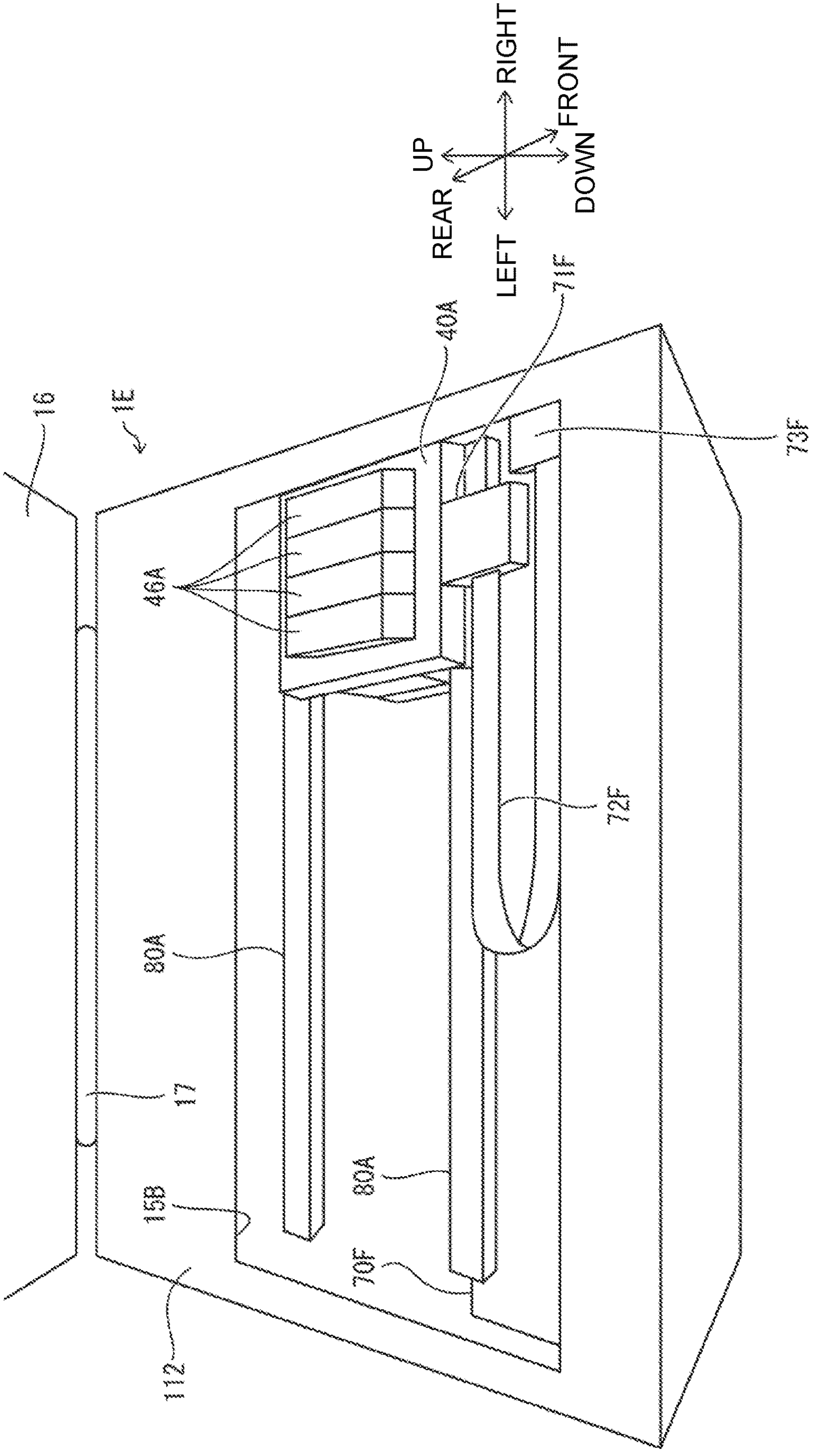
FIG. 14 is a view of the ink-jet printer 1E depicted in FIG. 13, as seen from thereabove.

An ink-jet printer 1E according to an eighth modification of the present disclosure will be explained, with reference to FIGS. 13 and 14. Note that in FIG. 14, the discharge tray 22 is omitted. As depicted in FIG. 13, as compared with the ink-jet printer 1C, the ink-jet printer 1E is different from the ink-jet printer 1C in view of a point that the ink-jet printer 1E is not provided with the holder 70D and that the ink-jet printer 1E is provided with a partitioning part 70F.

The ink-jet printer 1E is provided with a connecting part 71F, a wiring 72F and a substrate 73F. The substrate 73F is configured to control the liquid discharging head 41 of the printing part 4 and is provided on the partitioning part 70F. The substrate 73F is electrically connected to the connecting part 71F by the wiring 72F.

The connecting part 71F is provided on a head carriage 40A, and electrically connects the wiring 72 and a liquid discharging head 41. The wiring 72F electrically connects the liquid discharging head 41 and the substrate 73. The wiring 72F is, for example, a flexible wiring such as a FPC (Flexible Printed Circuit), etc. As depicted in FIG. 14, the wiring 72F extends leftward from the substrate 73F, is folded back rightward at an intermediate location of the wiring 72F and is connected to the connecting part 71F.

The partitioning part 70F is configured to partition the wiring 72F and the cutter unit 6 from each other, and is an example of the "shielding part". The partitioning part 70F is provided to extend in the front-rear direction and the left-right direction. The partitioning part 70F shields at least a part of the cutter unit 6 from the outside of the casing 11A. For example, the partitioning part 70F may cover a location above the cutter unit 6. Further, the partitioning part 70F supports the wiring 72.

It is possible to shield at least the part of the cutter unit 6 by the partitioning part 70F which partitions the cutter unit 6 from the wiring 72 electrically connecting the printing part 4A and the substrate 73F. Accordingly, there is no need to newly provide a member configured to shield the cutter unit 6. Thus, the manufacturing cost of the ink-jet printer 1E can be reduced. Further, since the partitioning part 70F supports the wiring 72F, the partitioning part 70F is capable of providing both of a function of partitioning the wiring 72F and the cutter unit 6 from each other and a function of supporting the wiring 72F.

Ninth Modification

Figure 15:
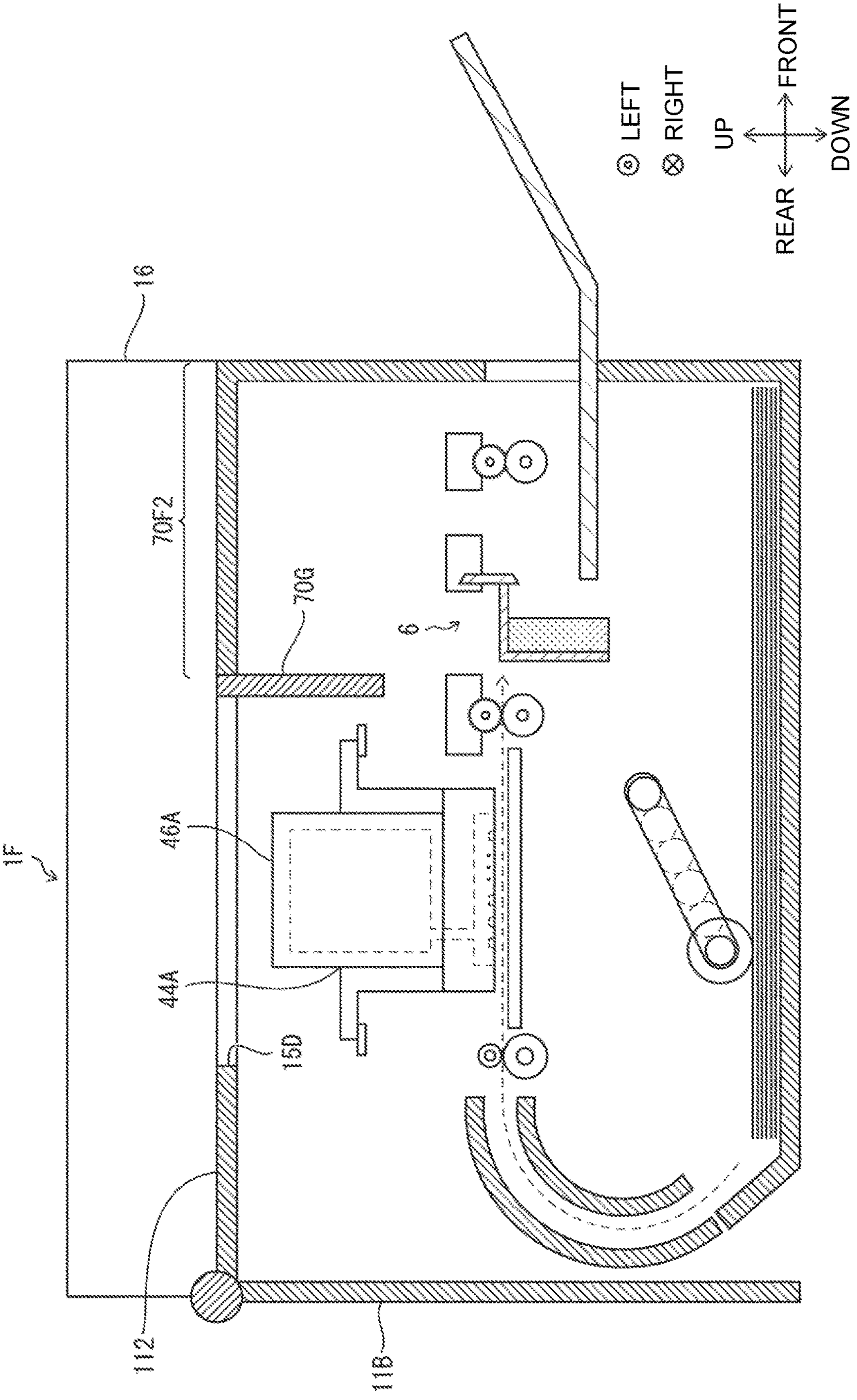
FIG. 15 is a cross-sectional view depicting an example of the internal configuration of an ink-jet printer 1F.

An ink-jet printer 1F according to a ninth modification of the present disclosure will be explained, with reference to FIG. 15. As depicted in FIG. 15, as compared with the ink-jet printer 1C, the ink-jet printer 1F is different from the ink-jet printer 1C in view of a point that the ink-jet printer 1F is not provided with the holder 70D, a point that the casing 11A is changed to a casing 11B and a point that the ink-jet printer 1F is provided with a shielding part 70G.

As compared with the casing 11A, the casing 11B is different from the casing 11A in view of a point that an opening 15D, which is smaller than the opening 15B, is formed in the casing 11B. The opening 15D is formed at a location above the installment part 44A and in an upper wall 112 of the casing 11B. In a case that a shielding part 70F2, which is a part of the upper wall 112 of the casing 11B, is located at a second position at which the shielding part 70F2 releases the opening 15D of a scanner unit 16, the shielding part 70F2 shields at least a part of the cutter unit 6 from the outside of the casing 11B.

Since it is possible to shield at least the part of the cutter unit 6 by the shielding part 70F2 which is the part of the upper wall 112 of the casing 11B, there is no need to newly provide a member configured to shield the cuter unit 6. Accordingly, the manufacturing cost of the ink-jet printer 1F can be reduced.

Further, the shielding part 70G is provided on the shielding part 70F2 such that the shielding part 70G extends downward from an end part on the rear side in the shielding part 70F2. The shielding part 70G also shields at least the part of the cutter unit 6 from the outside of the casing 11B. Accordingly, in a case that the scanner unit 16 is opened and that the cartridge 46A is (to be) exchanged, it is possible to prevent any access to the cutter unit 6 by the shielding part 70G.

Tenth Modification

Figure 16:
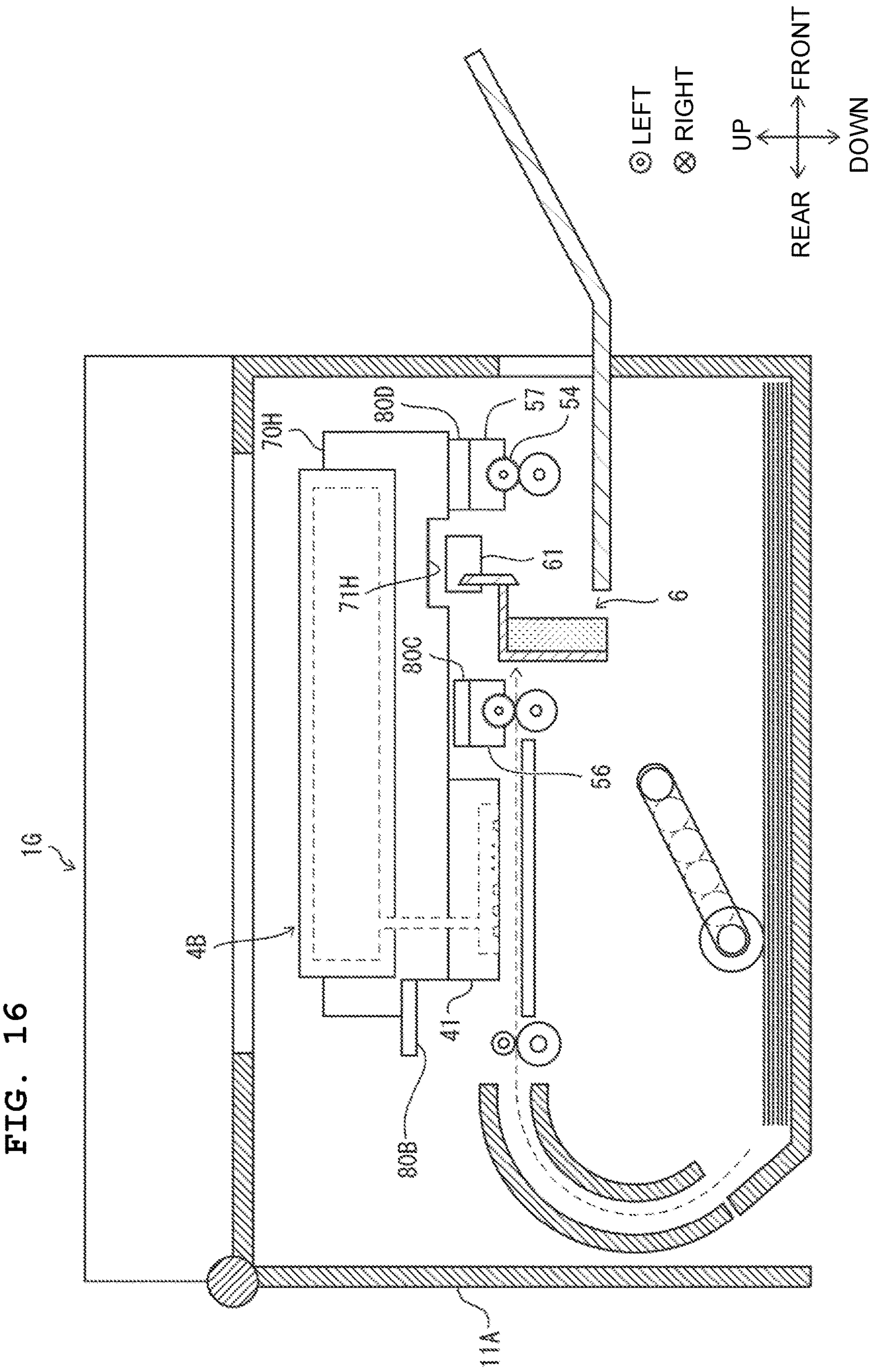
FIG. 16 is a cross-sectional view depicting an example of the internal configuration of an ink-jet printer 1G.

An ink-jet printer 1G according to a tenth modification of the present disclosure will be explained, with reference to FIG. 16. As depicted in FIG. 16, as compared with the ink-jet printer 1C, the ink-jet printer 1G is different from the ink-jet printer 1C in view of a point that the ink-jet printer 1G is not provided with the holder 70D and the supporting frame 80A, a point that the printing part 4 is changed to a printing part 4B and a point that the ink-jet printer 1G is provided with supporting frames 80B, 80C and 80D. Further, as compared with the ink-jet printer 1C, the ink-jet printer 1G is different from the ink-jet printer 1C in view of a point that the ink-jet printer 1G is provided with holders 56 and 57.

As compared with the printing part 4A, the printing part 4B is different from the printing part 4A in view of a point that the head carriage 40 is changed to a head carriage 70H. A driving force of a non-illustrated head carriage motor is transmitted to the head carriage 70H, thereby causing the head carriage 70H to move reciprocally in the left-right direction along the supporting frames 80B, 80C and 80D.

A recessed part 71H is formed in a lower surface of the head carriage 70H, and at least a part of a cutter carriage 61 is arranged in a space surrounded by the recessed part 71H. The head carriage 70H holds a liquid discharging head 41. The supporting frames 80B and 80D movably support the head carriage 70H. The supporting frame 80C is provided on the holder 56 and supports the holder 56. The supporting frame 80D is provided on the holder 57. The holder 57 holds a plurality of spur rollers 54.

The cutter unit 6 is arranged at a location below the head carriage 70H. By arranging the cutter unit 6 at the location below the head carriage 70H, it is possible to make the size in a horizontal direction of the ink-jet printing 1G to be small, as compared with a case that the cutter unit 6 and the head carriage 70H do not overlap with each other in the up-down direction.

Further, the head carriage 70H is an example of the "shielding part" which shields at least the part of the cutter unit 6 from the outside of the casing 11A, by covering a location above the cutter unit 6. By arranging the head carriage 70H at the location above the cutter unit 6, it is possible to shield the cutter unit 6 by the head carriage 70H. Thus, there is no need to newly provide a member configured to shield the cuter unit 6. Accordingly, the manufacturing cost of the ink-jet printer 1G can be reduced.

The present disclosure is not limited to each of the embodiments described above, and various changes can be made within the scope of the claims; an embodiment which is obtained by appropriately combining the technical means disclosed in the respective, different embodiments is also included in the technical scope of the present disclosure.

The present disclosure may be realized also in the following aspect. In the printing apparatus according to an aspect of the present disclosure, it is allowable that the shielding part is configured to move, accompanying with a first action in which the opening/closing part is moved from the first position to the second position, so that the shielding part shields at least the part of the processing unit from the outside of the casing.

Accompanying with the first action in which the opening/closing part is moved from the first position to the second position, the shielding part moves so that the shielding part shields at least the part of the processing unit. Accordingly, in a case that the opening/closing part is opened, there is provided a state that at least the part of the processing unit is shielded by the shielding part. Therefore, in a case that the opening/closing part is opened, and that the cartridge is being exchanged, it is possible to prevent, by the shielding part, any access to the processing unit.

In the printing apparatus according to the aspect of the present disclosure, it is allowable that the shielding part is provided to be rotatable in an inside of the casing, and configured to make contact with a first contact part, which is provided on the opening/closing part, and to rotate accompanying with the first action, to thereby move from a contact position at which the shielding part is capable of making contact with the first contact part to a shielding position at which the shielding part shields at least the part of the processing unit from the outside of the casing. By a simple structure in which the shielding part is provided to be rotatable in the inside of the casing, it is possible to provide a state that the shielding part shields at least the part of the processing unit in the case that the opening/closing part is opened.

The printing apparatus according to the aspect of the present disclosure may further include a second contact part provided on a rotation shaft, which is configured to rotate the shielding part, and configured to rotate accompanying with a rotation of the shielding part; it is allowable that the shielding part is configured to move from the shielding position to the contact position by the second contact part making contact with the first contact part and rotating accompanying with a second action in which the opening/closing part is moved from the second position to the first position.

Accompanying with an action in which the opening/closing part is closed, the shielding part returns from the shielding position to the contact position. Accordingly, in a case that the opening/closing part is opened again, the shielding part is moved from the contact position to the shielding position, thereby making it possible to provide a state that the shielding part shields at least the part of the processing unit. Namely, accompanying with the opening/closing operation (action) of the opening/closing part, the shielding part is capable of repeating the movement thereof between the contact position and the shielding position.

In the printing apparatus according to the aspect of the present disclosure, it is allowable that the processing unit is configured to move, accompanying with a first action in which the opening/closing part is moved from the first position to the second position, so that the shielding part shields at least the part of the processing unit from the outside of the casing.

Accompanying with the first action in which the opening/closing part is moved from the first position to the second position, the shielding part is moved so as to shield at least the part of the processing unit. Accordingly, in a case that the opening/closing part is opened, there is provided a state that at least the part of the processing unit is shielded by the shielding part. Therefore, in the case that the opening/closing part is opened, and that the cartridge is (being) exchanged, it is possible to prevent, by the shielding part, any access to the processing unit.

In the printing apparatus according to the aspect of the present disclosure, it is allowable that the shielding part is a holder configured to hold a guide member which is configured to guide, to the conveying direction, the printing medium having the image printed thereon by the printing part. Since at least the part of the processing unit can be shielded by the holder configured to hold the guide member which guides the printing medium to the conveying direction, there is no need to newly provide a member configured to shield the processing unit. Accordingly, the manufacturing cost of the printing apparatus can be reduced.

In the printing apparatus according to the aspect of the present disclosure, it is allowable that the printing part is provided with a head carriage configured to hold a liquid discharging head having a nozzle from which a liquid is discharged; and that the shielding part is a supporting frame configured to movably support the head carriage. Since at least the part of the processing unit can be shielded by the supporting frame configured to movably support the head carriage, there is no need to newly provide a member configured to shield the processing unit. Accordingly, the manufacturing cost of the printing apparatus can be reduced.

The printing apparatus according to the aspect of the present disclosure may further include a substrate configured to control the printing part; it is allowable that the shielding part is a partitioning part configured to partition the processing unit from a wiring electrically connecting the printing part and the substrate. It is possible to shield at least the part of the processing unit by the partitioning part configured to partition the processing unit from the wiring electrically connecting the printing part and the substrate. Accordingly, there is no need to newly provide a member configured to shield the processing unit. Accordingly, the manufacturing cost of the printing apparatus can be reduced.

In the printing apparatus according to the aspect of the present disclosure, it is allowable that the partitioning part is configured to support the wiring. Since the partitioning part supports the wiring, the partitioning part is capable of providing both of a function of partitioning the wiring and the processing unit from each other and the function of supporting the wiring.

In the printing apparatus according to the aspect of the present disclosure, it is allowable that the opening is defined at a position at which the opening is capable of releasing, to the outside of the casing, the part of the installment part on the downstream side in the conveying direction and in a front wall on the downstream side in conveying direction of the casing; and that the shielding part is a part of the front wall on the downstream side in conveying direction of the casing. Since at least the part of the processing unit can be shielded by the part of the front wall of the casing, there is no need to newly provide a member configured to shield the processing unit. Accordingly, the manufacturing cost of the printing apparatus can be reduced.

In the printing apparatus according to the aspect of the present disclosure, it is allowable that the opening is defined at the location above the installment part and in an upper wall of the casing; and that the shielding part is a part of the upper wall of the casing. Since it is possible to shield at least the part of the processing unit by the part of the upper wall of the casing, there is no need to newly provide a member configured to shield the processing unit. Accordingly, the manufacturing cost of the printing apparatus can be reduced.

In the printing apparatus according to the aspect of the present disclosure, it is allowable that the printing part is provided with a head carriage configured to hold a liquid discharging head having a nozzle from which a liquid is discharged; and that the processing unit is arranged at a location below the head carriage. By arranging the processing unit at the location below the head carriage, it is possible to make the size, in a horizontal direction, of the printing apparatus to be small, as compared with a case wherein the processing unit and the head carriage do not overlap with each other in the up-down direction.

In the printing apparatus according to the aspect of the present disclosure, it is allowable that the shielding part is the head carriage configured to cover a location above the processing unit. By arranging the processing unit at the location above the processing unit, it is possible to shield at least a part of the processing unit by the head carriage. Thus, there is no need to newly provide a member configured to shield the processing unit. Accordingly, the manufacturing cost of the printing apparatus can be reduced.

What is claimed is:

1. A printing apparatus comprising:
- a casing in which an opening is defined;
- an opening/closing part configured to be movable to a first position at which the opening/closing part covers the opening and to a second position at which the opening/closing part releases the opening;
- a printing part including an installment part in which a cartridge is installable, and configured to print an image on a print medium;
- a processing unit arranged on a downstream side in a conveying direction, of the print medium, with respect to the printing part, and configured to process the print medium having the image printed thereon by the printing part, the processing unit being configured to perform at least one of cutting the print medium, imparting a creasing to the print medium, or imparting a perforation to the print medium; and
- a shielding part configured to shield at least a part of the processing unit, wherein
- in a case that the opening/closing part is located at the second position, the opening is located at a position at which the opening releases a location above the installment part or a part, of the installment part, on the downstream side in the conveying direction to an outside of the casing,
- in a case that the opening/closing part is located at the second position, the shielding part is configured to shield at least the part of the processing unit from the outside of the casing, and
- the shielding part is configured to move, accompanying with a first action in which the opening/closing part is moved from the first position to the second position, so that the shielding part shields at least the part of the processing unit from the outside of the casing.

2. The printing apparatus according to claim 1, wherein
- the shielding part is rotatable in an inside of the casing, and configured to make contact with a first contact part, which is provided on the opening/closing part, and to rotate accompanying with the first action, to thereby move from a contact position at which the shielding part is capable of making contact with the first contact part to a shielding position at which the shielding part shields at least the part of the processing unit from the outside of the casing.

3. The printing apparatus according to claim 2, further comprising a second contact part located on a rotation shaft, which is configured to rotate the shielding part, and configured to rotate accompanying with a rotation of the shielding part, wherein
- the second contact part makes contact with the first contact part and rotates, accompanying with a second action in which the opening/closing part is moved from the second position to the first position, thereby causing the shielding part to move from the shielding position to the contact position.

4. A printing apparatus comprising:
- a casing in which an opening is defined;
- an opening/closing part configured to be movable to a first position at which the opening/closing part covers the opening and to a second position at which the opening/closing part releases the opening;
- a printing part including an installment part in which a cartridge is installable, and configured to print an image on a print medium;
- a processing unit arranged on a downstream side in a conveying direction, of the print medium, with respect to the printing part, and configured to process the print medium having the image printed thereon by the printing part, the processing unit being configured to perform at least one of cutting the print medium, imparting a creasing to the print medium, or imparting a perforation to the print medium; and
- a shielding part configured to shield at least a part of the processing unit, wherein
- in a case that the opening/closing part is located at the second position, the opening is located at a position at which the opening releases a location above the installment part or a part, of the installment part, on the downstream side in the conveying direction to an outside of the casing,
- in a case that the opening/closing part is located at the second position, the shielding part is configured to shield at least the part of the processing unit from the outside of the casing, and
- the printing part includes a head carriage configured to hold a liquid discharging head including a nozzle for discharging a liquid, and
- the shielding part is a supporting frame configured to movably support the head carriage.

5. The printing apparatus according to claim 4, wherein
- the printing part further includes a head carriage and a platen.

6. The printing apparatus according to claim 4, wherein
- the processing unit is a cutter unit having a cutter carriage, a plurality of blades, and a cutter supporting part.

7. The printing apparatus according to claim 4, wherein in a case that the opening/closing part is located at the second position, the installment part is exposed from the opening of the casing.

8. The printing apparatus according to claim 4, wherein the shielding part is configured to shield at least the part of the cutter unit from the outside of the casing as the installment part is viewed through the opening.

9. A printing apparatus comprising:

a casing in which an opening is defined;

an opening/closing part configured to be movable to a first position at which the opening/closing part covers the opening and to a second position at which the opening/closing part releases the opening;

a printing part including an installment part in which a cartridge is installable, and configured to print an image on a print medium;

a processing unit arranged on a downstream side in a conveying direction, of the print medium, with respect to the printing part, and configured to process the print medium having the image printed thereon by the printing part, the processing unit being configured to perform at least one of cutting the print medium, imparting a creasing to the print medium, or imparting a perforation to the print medium; and a shielding part configured to shield at least a part of the processing unit, wherein in a case that the opening/closing part is located at the second position, the opening is located at a position at which the opening releases a location above the installment part or a part, of the installment part, on the downstream side in the conveying direction to an outside of the casing, in a case that the opening/closing part is located at the second position, the shielding part is configured to shield at least the part of the processing unit from the outside of the casing, and the printing apparatus further comprises a substrate configured to control the printing part, wherein the shielding part is a partitioning part configured to partition the processing unit from a wiring electrically connecting the printing part and the substrate.

10. The printing apparatus according to claim 9, wherein the partitioning part is configured to support the wiring.

11. The printing apparatus according to claim 9, wherein the printing part further includes a head carriage and a platen.

12. The printing apparatus according to claim 9, wherein the processing unit is a cutter unit having a cutter carriage, a plurality of blades, and a cutter supporting part.

13. The printing apparatus according to claim 9, wherein in a case that the opening/closing part is located at the second position, the installment part is exposed from the opening of the casing.

14. The printing apparatus according to claim 9, wherein the shielding part is configured to shield at least the part of the cutter unit from the outside of the casing as the installment part is viewed through the opening.

15. The printing apparatus according to claim 1, wherein the opening is located at a position at which the opening is capable of releasing, to the outside of the casing, the part of the installment part on the downstream side in the conveying direction and in a front wall on the downstream side in conveying direction of the casing, and the shielding part is a part of the front wall on the downstream side in a conveyance direction of the casing.

16. A printing apparatus comprising:

a casing in which an opening is defined;

an opening/closing part configured to be movable to a first position at which the opening/closing part covers the opening and to a second position at which the opening/closing part releases the opening;

a printing part including an installment part in which a cartridge is installable, and configured to print an image on a print medium;

a processing unit arranged on a downstream side in a conveying direction, of the print medium, with respect to the printing part, and configured to process the print medium having the image printed thereon by the printing part, the processing unit being configured to perform at least one of cutting the print medium, imparting a creasing to the print medium, or imparting a perforation to the print medium; and a shielding part configured to shield at least a part of the processing unit, wherein in a case that the opening/closing part is located at the second position, the opening is located at a position at which the opening releases a location above the installment part or a part, of the installment part, on the downstream side in the conveying direction to an outside of the casing, in a case that the opening/closing part is located at the second position, the shielding part is configured to shield at least the part of the processing unit from the outside of the casing, the opening is located at the location above the installment part and in an upper wall of the casing, and the shielding part is a part of the upper wall of the casing.

17. The printing apparatus according to claim 16, wherein the printing part further includes a head carriage and a platen.

18. The printing apparatus according to claim 16, wherein the processing unit is a cutter unit having a cutter carriage, a plurality of blades, and a cutter supporting part.

19. The printing apparatus according to claim 16, wherein in a case that the opening/closing part is located at the second position, the installment part is exposed from the opening of the casing.

20. The printing apparatus according to claim 16, wherein the shielding part is configured to shield at least the part of the cutter unit from the outside of the casing as the installment part is viewed through the opening.

21. A printing apparatus comprising:

a casing in which an opening is defined;

an opening/closing part configured to be movable to a first position at which the opening/closing part covers the opening and to a second position at which the opening/closing part releases the opening;

a printing part including an installment part in which a cartridge is installable, and configured to print an image on a print medium;

a processing unit arranged on a downstream side in a conveying direction, of the print medium, with respect to the printing part, and configured to process the print medium having the image printed thereon by the printing part, the processing unit being configured to perform at least one of cutting the print medium, imparting a creasing to the print medium, or imparting a perforation to the print medium; and a shielding part configured to shield at least a part of the processing unit, wherein in a case that the opening/closing part is located at the second position, the opening is located at a position at which the opening releases a location above the installment part or a part, of the installment part, on the downstream side in the conveying direction to an outside of the casing, in a case that the opening/closing part is located at the second position, the shielding part is configured to shield at least the part of the processing unit from the outside of the casing, the printing part includes a head carriage configured to hold a liquid discharging head including a nozzle, and the processing unit is located below the head carriage.

22. The printing apparatus according to claim 21, wherein the shielding part is the head carriage configured to cover a location above the processing unit.

23. The printing apparatus according to claim 21, wherein the printing part further includes a head carriage and a platen.

24. The printing apparatus according to claim 21, wherein the processing unit is a cutter unit having a cutter carriage, a plurality of blades, and a cutter supporting part.

25. The printing apparatus according to claim 21, wherein in a case that the opening/closing part is located at the second position, the installment part is exposed from the opening of the casing.

26. The printing apparatus according to claim 21, wherein the shielding part is configured to shield at least the part of the cutter unit from the outside of the casing as the installment part is viewed through the opening.

27. The printing apparatus according to claim 1, wherein the printing part further includes a head carriage and a platen.

28. The printing apparatus according to claim 1, wherein the processing unit is a cutter unit having a cutter carriage, a plurality of blades, and a cutter supporting part.

29. The printing apparatus according to claim 1, wherein in a case that the opening/closing part is located at the second position, the installment part is exposed from the opening of the casing.

30. The printing apparatus according to claim 1, wherein the shielding part is configured to shield at least the part of the cutter unit from the outside of the casing as the installment part is viewed through the opening.

31. A printing apparatus comprising:

a casing in which an opening is defined;

an opening/closing part configured to be movable to a first position at which the opening/closing part covers the opening and to a second position at which the opening/closing part releases the opening;

a printing part including an installment part in which a cartridge is installable, and configured to print an image on a print medium;

a processing unit arranged on a downstream side in a conveying direction, of the print medium, with respect to the printing part, and configured to process the print medium having the image printed thereon by the printing part, the processing unit being configured to perform at least one of cutting the print medium, imparting a creasing to the print medium, or imparting a perforation to the print medium; and a shielding part configured to shield at least a part of the processing unit, wherein in a case that the opening/closing part is located at the second position, the opening is located at a position at which the opening releases a location above the installment part or a part, of the installment part, on the downstream side in the conveying direction to an outside of the casing, in a case that the opening/closing part is located at the second position, the shielding part is configured to shield at least the part of the processing unit from the outside of the casing, and the processing unit is configured to move, accompanying with a first action in which the opening/closing part is moved from the first position to the second position, so that the shielding part shields at least the part of the processing unit from the outside of the casing.

32. The printing apparatus according to claim 31, wherein the printing part further includes a head carriage and a platen.

33. The printing apparatus according to claim 31, wherein the processing unit is a cutter unit having a cutter carriage, a plurality of blades, and a cutter supporting part.

34. The printing apparatus according to claim 31, wherein in a case that the opening/closing part is located at the second position, the installment part is exposed from the opening of the casing.

35. The printing apparatus according to claim 31, wherein the shielding part is configured to shield at least the part of the cutter unit from the outside of the casing as the installment part is viewed through the opening.

36. A printing apparatus comprising:

a casing in which an opening is defined;

an opening/closing part configured to be movable to a first position at which the opening/closing part covers the opening and to a second position at which the opening/closing part releases the opening;

a printing part including an installment part in which a cartridge is installable, and configured to print an image on a print medium;

a processing unit arranged on a downstream side in a conveying direction, of the print medium, with respect to the printing part, and configured to process the print medium having the image printed thereon by the printing part, the processing unit being configured to perform at least one of cutting the print medium, imparting a creasing to the print medium, or imparting a perforation to the print medium; and a shielding part configured to shield at least a part of the processing unit, wherein in a case that the opening/closing part is located at the second position, the opening is located at a position at which the opening releases a location above the installment part or a part, of the installment part, on the downstream side in the conveying direction to an outside of the casing, in a case that the opening/closing part is located at the second position, the shielding part is configured to shield at least the part of the processing unit from the outside of the casing, and the shielding part is a holder configured to hold a guide member which is configured to guide, to the conveying direction, the printing medium having the image printed thereon by the printing part.

37. The printing apparatus according to claim 36, wherein the printing part further includes a head carriage and a platen.

38. The printing apparatus according to claim 36, wherein the processing unit is a cutter unit having a cutter carriage, a plurality of blades, and a cutter supporting part.

39. The printing apparatus according to claim 36, wherein in a case that the opening/closing part is located at the second position, the installment part is exposed from the opening of the casing.

40. The printing apparatus according to claim 36, wherein the shielding part is configured to shield at least the part of the cutter unit from the outside of the casing as the installment part is viewed through the opening.

* * * * *